(12) United States Patent
Fukuda

(10) Patent No.: US 10,719,278 B2
(45) Date of Patent: Jul. 21, 2020

(54) PRINTING APPARATUS THAT PERFORMS NOTIFICATION PROCESSING ACCORDING TO THE STATE OF THE PRINTING APPARATUS

(71) Applicant: CANON KABUSHIKI KAISHA, Tokyo (JP)

(72) Inventor: Tatsuya Fukuda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/294,754

(22) Filed: Mar. 6, 2019

(65) Prior Publication Data

US 2019/0286376 A1   Sep. 19, 2019

(30) Foreign Application Priority Data

Mar. 13, 2018 (JP) ................................. 2018-046012

(51) Int. Cl.
  *G06F 3/12* (2006.01)
  *G06K 15/10* (2006.01)
  *G06K 15/00* (2006.01)

(52) U.S. Cl.
  CPC ............ *G06F 3/122* (2013.01); *G06F 3/1231* (2013.01); *G06F 3/1284* (2013.01); *G06K 15/005* (2013.01); *G06K 15/102* (2013.01)

(58) Field of Classification Search
  None
  See application file for complete search history.

(56) References Cited

U.S. PATENT DOCUMENTS

2012/0026546 A1\* 2/2012 Miura ...................... B41J 2/175
                                                      358/1.15
2018/0004148 A1\* 1/2018 Kanno ............... G03G 21/1638

FOREIGN PATENT DOCUMENTS

JP          2006-044128 A    2/2006

\* cited by examiner

*Primary Examiner* — Andrew H Lam
(74) *Attorney, Agent, or Firm* — Canon U.S.A., Inc. I.P. Division

(57) ABSTRACT

A user operation is prevented for opening an opening and closing unit from being continuously performed on the opening and closing unit while the opening and closing unit is locked by providing a printing apparatus including a notification unit configured to perform, in a case that a user operation for opening the opening and closing unit is performed on the opening and closing unit in a state where the opening and closing unit is locked, predetermined notification processing according to a state of the printing apparatus at the time that the user operation is performed.

19 Claims, 17 Drawing Sheets

PRINTING APPARATUS THAT PERFORMS NOTIFICATION PROCESSING ACCORDING TO THE STATE OF THE PRINTING APPARATUS

BACKGROUND OF THE DISCLOSURE

Field of the Disclosure

The disclosure relates to a printing apparatus.

Description of the Related Art

A known printing apparatus is provided with an opening and closing unit such as an openable door as a part of a housing for covering a printing unit, and is capable of locking and unlocking the opening and closing unit. Japanese Patent Application Laid-Open No. 2006-44128 discusses an apparatus which locks an opening and closing unit during an image forming operation and unlocks the opening and closing unit when the image forming operation is completed.

For example, while the opening and closing unit is locked, a user who does not know that the opening and closing unit is currently locked may perform on the opening and closing unit an operation for opening the opening and closing unit. If a user operation for opening the opening and closing unit is continuously performed on the opening and closing unit while the opening and closing unit is locked, for example, an issue that the lock mechanism of the opening and closing unit is damaged arises.

The apparatus discussed in Japanese Patent Application Laid-Open No. 2006-44128 does not take into consideration control to be performed in a case where the user operation for opening the opening and closing unit is performed on the opening and closing unit while the opening and closing unit is locked. Therefore, Japanese Patent Application Laid-Open No. 2006-44128 has an issue that the operation for opening the opening and closing unit may be continuously performed on the opening and closing unit while the opening and closing unit is locked.

SUMMARY OF THE INVENTION

The disclosure is directed to preventing a user operation for opening the opening and closing unit from being continuously performed on the opening and closing unit while the opening and closing unit is locked.

According to an aspect of the disclosure, a printing apparatus includes a printing unit configured to perform printing via a printing unit, a locking unit configured to lock an operable opening and closing unit as a part of a housing for covering the printing unit, and a notification unit configured to perform, in a case that a user operation for opening the opening and closing unit is performed on the opening and closing unit in a state where the opening and closing unit is locked, predetermined notification processing according to a state of the printing apparatus at the time that the user operation is performed. In a state where the opening and closing unit is locked, the opening and closing unit is not opened even when the user operation for opening the opening and closing unit is performed on the opening and closing unit.

Further features and aspects of the disclosure will become apparent from the following description of example embodiments with reference to the attached drawings.

DESCRIPTION OF THE EMBODIMENTS

A printing apparatus according to a first example embodiment will be described below. Although, in the present example embodiment, an apparatus for performing printing based on an ink jet system will be described below as an example of a printing apparatus, the printing apparatus is not limited thereto. The disclosure is also applicable to apparatuses for performing printing based on printing systems other than ink jet systems (such as electrophotographic and heat sublimation systems).

Figure 1:
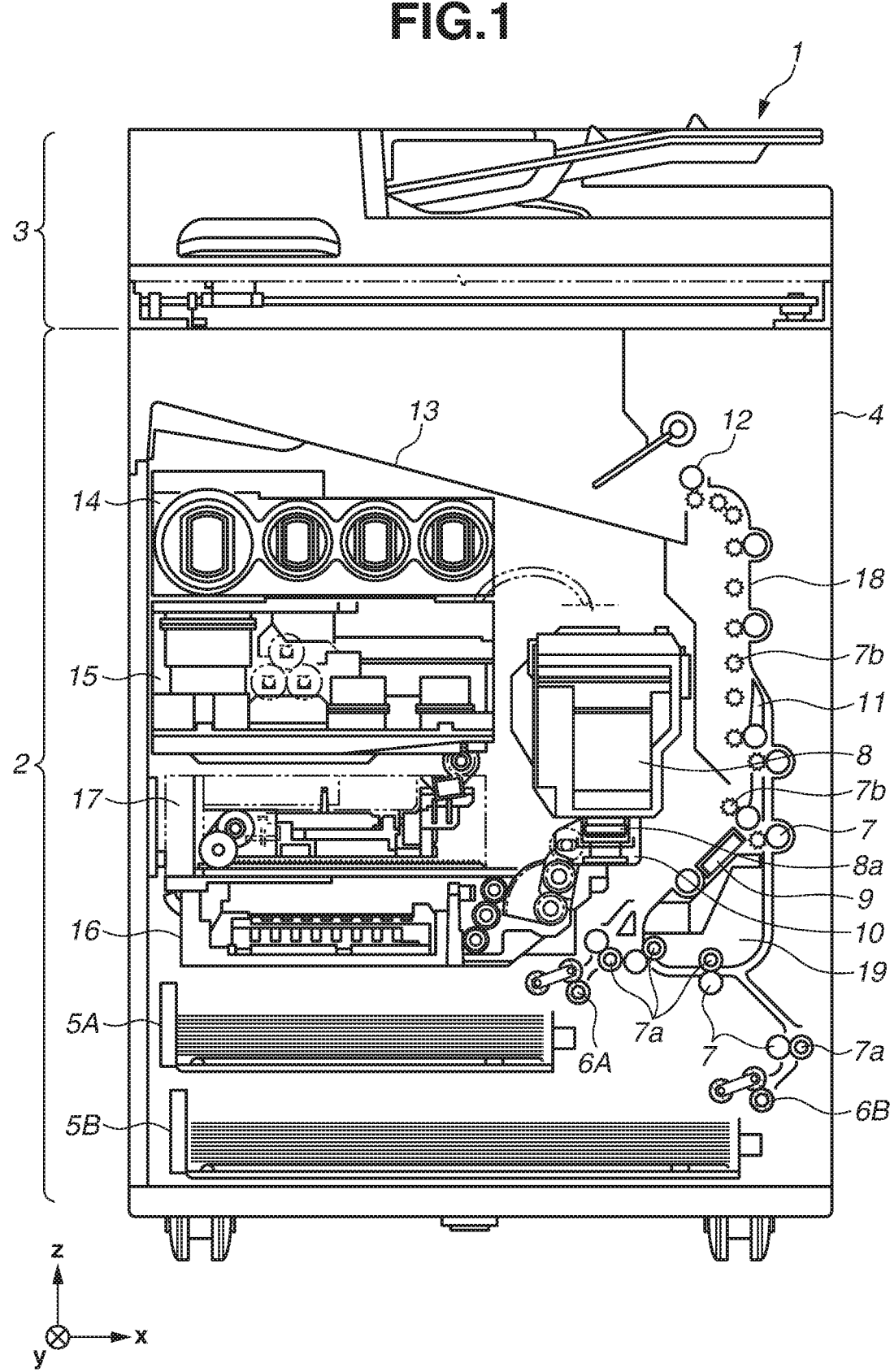
FIG. 1 illustrates an example internal configuration of a printing apparatus when the printing apparatus is in a standby state.

FIG. 1 illustrates an internal configuration of an ink jet printing apparatus 1 (hereinafter referred to as a printing apparatus 1) according to the present example embodiment. An ink jet printing apparatus is an apparatus for forming an image on a recording medium such as paper by ejecting ink as a recording agent. Referring to FIG. 1, the x direction denotes the horizontal direction, the y direction (vertical direction) denotes the direction in which a plurality of discharge ports is arranged in a print head 8, and the z direction denotes the vertical direction.

The printing apparatus 1 is a multifunction peripheral having a printing unit 2 and a scanner unit 3. The printing unit 2 and the scanner unit 3 can perform various kinds of processing related to print and read operations in a separated way or in an associative way. The scanner unit 3 provided with an auto document feeder (ADF) and a flatbed scanner (FBS) can read (scan) document sheets automatically fed by the ADF and a document sheet placed on the platen glass of the FBS by the user. Although the printing apparatus 1 according to the present example embodiment is a multi-function peripheral including the printing unit 2 and the scanner unit 3, the printing apparatus 1 does not necessarily include the scanner unit 3. FIG. 1 illustrates a standby state where the printing apparatus 1 is performing neither a print operation nor a read operation.

In the printing unit 2, a first cassette 5A and a second cassette 5B for storing recording mediums (cut sheets) S are detachably attached to the bottom (vertically lower portion) of a housing 4. Comparatively small recording media up to the A4 size are flatly stacked. In the first cassette 5A, and comparatively large recording media up to the A3 size are flatly stacked in the second cassette 5B. A first feeding unit 6A for separating and feeding the stored recording media one by one is disposed in the vicinity of the first cassette 5A. Likewise, a second feeding unit 6B is disposed in the vicinity of the second cassette 5B. When a print operation is performed, a recording medium S is selectively fed from either one cassette.

Conveyance rollers 7, a discharge roller 12, pinch rollers 7a, spur rollers 7b, a guide 18, an inner guide 19, and a flapper 11 form a conveyance mechanism for guiding the recording medium S in a predetermined direction. The conveyance rollers 7 are drive rollers disposed on the upstream side of the print head 8 and are driven by a conveyance motor (not illustrated). The pinch rollers 7a are driven rollers for nipping and rotating the recording medium S together with the conveyance rollers 7. The discharge roller 12 is a drive roller disposed on the downstream side of the print head 8 and is driven by a conveyance motor (not illustrated). The spur rollers 7b pinch and convey the recording medium S together with the discharge roller 12.

The guide 18 disposed in the conveyance path for the recording medium S guides the recording medium S in a predetermined direction. The inner guide 19 extending in the y direction and having a curved side surface guides the recording medium S along the side surface. The flapper 11 changes the conveyance direction of the recording medium S during a double-side print operation. The discharge tray 13 stacks and holds the recording media S discharged by the discharge roller 12 after completion of the print operation.

The print head 8 according to the present example embodiment is a full-line type chromatic color ink jet print head. A plurality of discharge ports for ejecting ink according to print data is arranged over a distance equivalent to the width of the recording medium S along the y direction illustrated in FIG. 1. When the print head 8 is at the standby position, a discharge port surface 8a of the print head 8 is capped by a cap unit 10, as illustrated in FIG. 1. When performing a print operation, the orientation of the print head 8 is changed by a print controller 202 (described below) so that the discharge port surface 8a faces a platen 9. The platen 9 composed of a flat plate extending in the y direction supports from the back surface the recording medium S to be subjected to the print operation by the print head 8. The movement of the print head 8 from the standby position to the print position will be described in detail below.

An ink tank unit (holding portion) 14 stores four chromatic color ink to be supplied to the print head 8. An ink supply unit 15 disposed in the middle of the flow channel connecting the ink tank unit 14 and the print head 8 adjusts the pressure and flow rate of ink in the print head 8 to suitable ranges. According to the present example embodiment, the ink supply unit 15 employing a circulation ink supply system adjusts the pressure of ink supplied to the print head 8 and the flow rate of ink collected from the print head 8 to suitable ranges.

A maintenance unit 16 including the cap unit 10 and a wiping unit 17 operates these units at a predetermined timing to perform maintenance operations on the print head 8. The maintenance operations will be described in detail below.

The maintenance unit 16 includes a collection unit (MTC) 20 which can be replaced by the user. The MTC 20 collects and holds waste ink unused for printing out of the ink stored in the ink tank unit 14.

Figure 2:
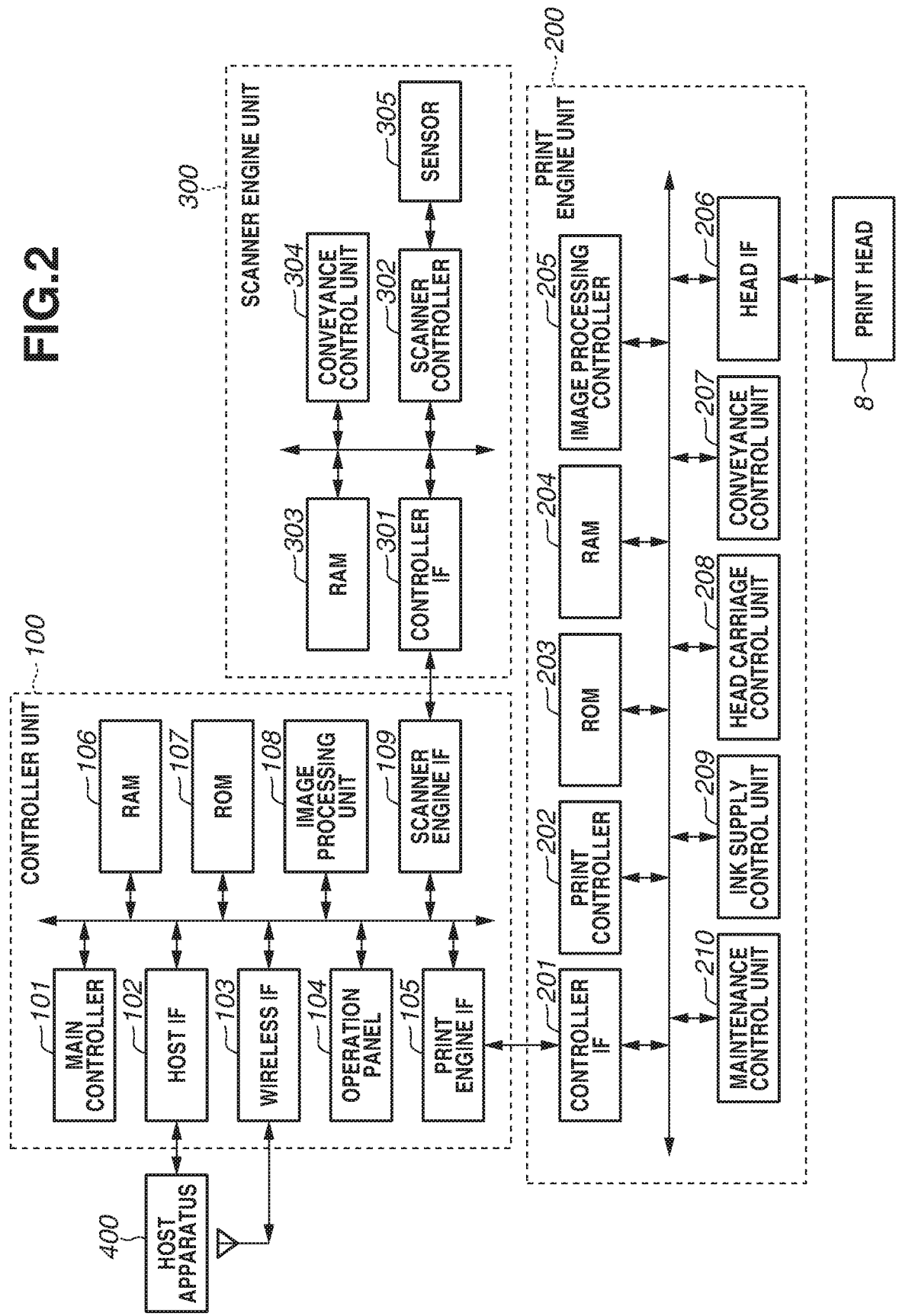
FIG. 2 illustrates example control configurations of the printing apparatus.

FIG. 2 is a block diagram illustrating control configurations of the printing apparatus 1. The control configurations mainly include a print engine unit 200 for totally controlling the printing unit 2, a scanner engine unit 300 for totally controlling the scanner unit 3, and a controller unit 100 for totally controlling the entire printing apparatus 1. The print controller 202 controls various mechanisms of the print engine unit 200 according to instructions of the main controller 101 of the controller unit 100. Various mechanisms of the scanner engine unit 300 are controlled by the main controller 101 of the controller unit 100. The control configurations will be described in detail below.

In the controller unit 100, the main controller 101 configured by a central processing unit (CPU) controls the entire printing apparatus 1 based on a program and various parameters stored in a read only memory (ROM) 107, by using a random access memory (RAM) 106 as a work area. For example, when a print job is input from a host apparatus 400 via a host interface (I/F) 102 or a wireless I/F 103, an image processing unit 108 performs predetermined image processing on received image data according to instructions of the main controller 101. Then, the main controller 101 transmits the image data having undergone the image processing to the print engine unit 200 via a print engine I/F 105.

The printing apparatus 1 may acquire image data from the host apparatus 400 via wireless communication or cable communication or acquire image data from an external storage device (such as a Universal Serial Bus (USB) memory) connected to the printing apparatus 1. The communication method used in wireless communication or cable communication is not limited to a certain method. Examples of communication methods applicable to wireless communication include Wireless Fidelity (Wi-Fi) (registered trademark) and Bluetooth (registered trademark). Examples of communication methods applicable to cable communication include USB. For example, when a read command is input from the host apparatus 400, the main controller 101 transmits the command to the scanner unit 3 via a scanner engine I/F 109.

An operation panel (display unit) 104 is a mechanism used for the user to perform input and output operations on the printing apparatus 1. The user can instruct the printing apparatus 1 to perform copy and scan operations, set the printing mode, and recognize information about the printing apparatus 1, via the operation panel 104.

In the print engine unit 200, the print controller 202 configured of a CPU controls various mechanisms included in the printing unit 2 based on a program and various parameters stored in a ROM 203, by using a RAM 204 as a work area. When the print controller 202 receives various commands and image data via a controller I/F 201, the print controller 202 once stores the various commands and image data in the RAM 204. The print controller 202 instructs an image processing controller 205 to convert the stored image data into print data to enable the print head 8 to use the image data for print operations. When print data is generated, the print controller 202 instructs the print head 8 to perform a print operation based on the print data via a head I/F 206. In this case, the print controller 202 drives the feeding units 6A and 6B, the conveyance rollers 7, the discharge roller 12, and the flapper 11 in FIG. 1 via a conveyance control unit 207 to convey the recording medium S. In accordance with an instruction of the print controller 202, the print head 8 performs the print operation in association with the conveyance operation of the recording medium S, thus performing print processing.

A head carriage control unit 208 changes the orientation and position of the print head 8 based on the operating states including the maintenance state and printing state of the printing apparatus 1. An ink supply control unit 209 controls the ink supply unit 15 such that the pressure of the ink to be supplied to the print head 8 falls within a suitable range. When performing the maintenance operation on the print head 8, the maintenance control unit 210 controls the operations of the cap unit 10 and the wiping unit 17 in the maintenance unit 16.

In the scanner engine unit 300, the main controller 101 controls hardware resources of a scanner controller 302 based on a program and various parameters stored in the ROM 107, by using the RAM 106 as a work area. Various mechanisms included in the scanner unit 3 are controlled in this way. For example, the main controller 101 controls hardware resources in the scanner controller 302 via a controller I/F 301 to convey the document sheet placed on the ADF by the user via a conveyance control unit 304. Then, the main controller 101 reads the conveyed document sheet by using a sensor 305, and the scanner controller 302 stores the read image data in a RAM 303. After converting the image data acquired as described above into print data, the print controller 202 can instruct the print head 8 to perform the print operation based on the image data read by the scanner controller 302.

Figure 3:
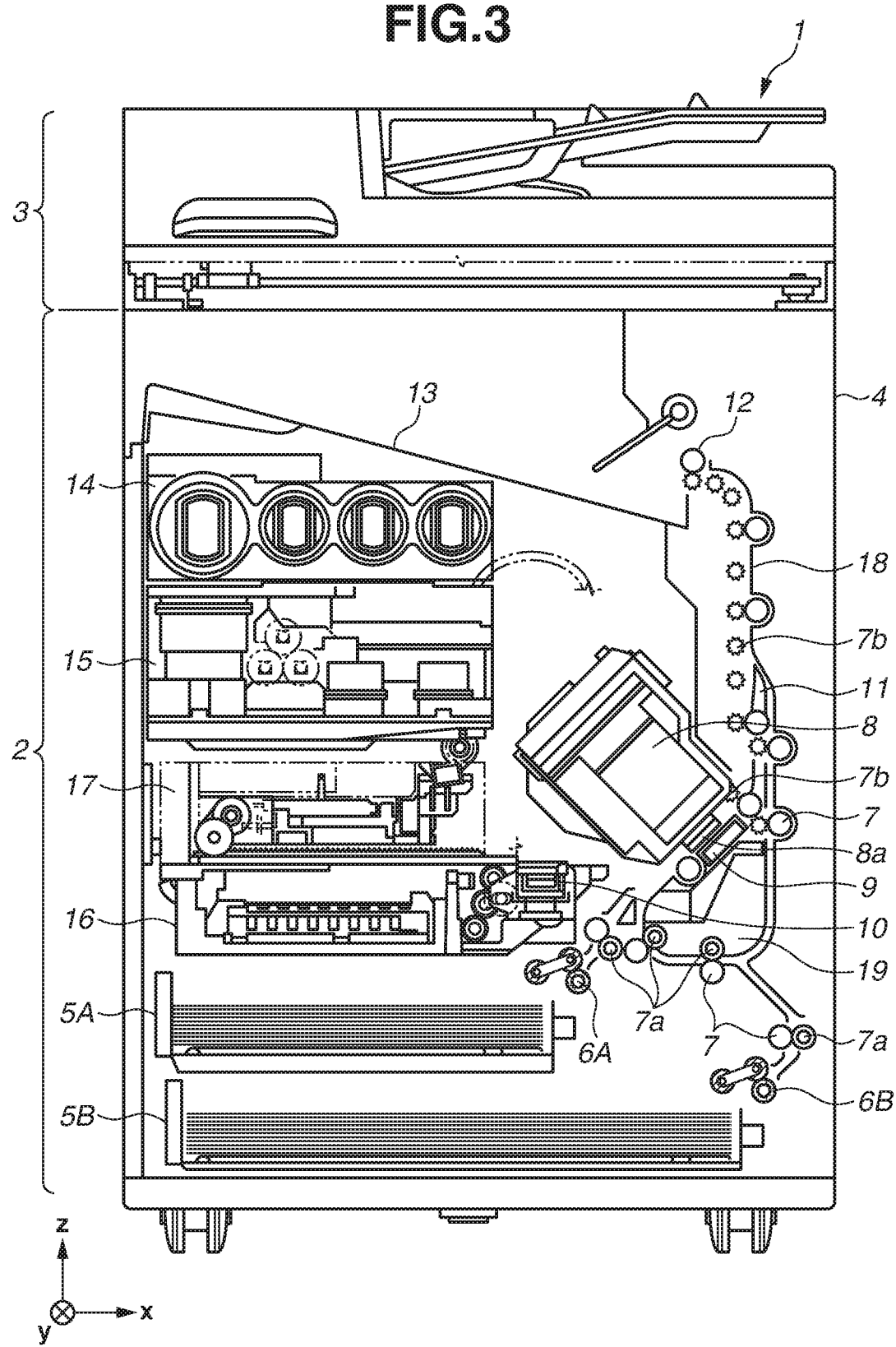
FIG. 3 illustrates an example internal configuration of the printing apparatus when the printing apparatus is in a printing state.

FIG. 3 illustrates an internal configuration of the printing apparatus 1 in the printing state. As compared with the standby state illustrated in FIG. 1, the cap unit 10 separates from the discharge port surface 8a of the print head 8, and the discharge port surface 8a faces the platen 9. According to the present example embodiment, the flat surface of the platen 9 is inclined by about 45 degrees with respect to the horizontal direction, and the discharge port surface 8a of the print head 8 at the print position is also inclined by about 45 degrees with respect to the horizontal direction so that the distance from the platen 9 is kept constant.

When moving the print head 8 from the standby position illustrated in FIG. 1 to the print position illustrated in FIG. 3, the print controller 202 lowers the cap unit 10 to the evacuating position illustrated in FIG. 3 by using the maintenance control unit 210. This makes the discharge port surface 8a of the print head 8 separate from a cap member 10a. Subsequently, the print controller 202 rotates the print head 8 by 45 degrees while adjusting the height thereof in the vertical direction by using the head carriage control unit 208 so that the discharge port surface 8a faces the platen 9. When the print operation is completed and the print head 8 moves from the print position to the standby position, the print controller 202 performs the above-described processes in reverse order.

The conveyance path for the recording medium S in the printing unit 2 will be described below. When a print command (print job) is input, the print controller 202 first moves the print head 8 to the print position illustrated in FIG. 3 by using the maintenance control unit 210 and the head carriage control unit 208. Subsequently, by using the conveyance control unit 207, the print controller 202 drives either the first feeding unit 6A or the second feeding unit 6B according to the print command to feed the recording medium S.

Figure 4C:
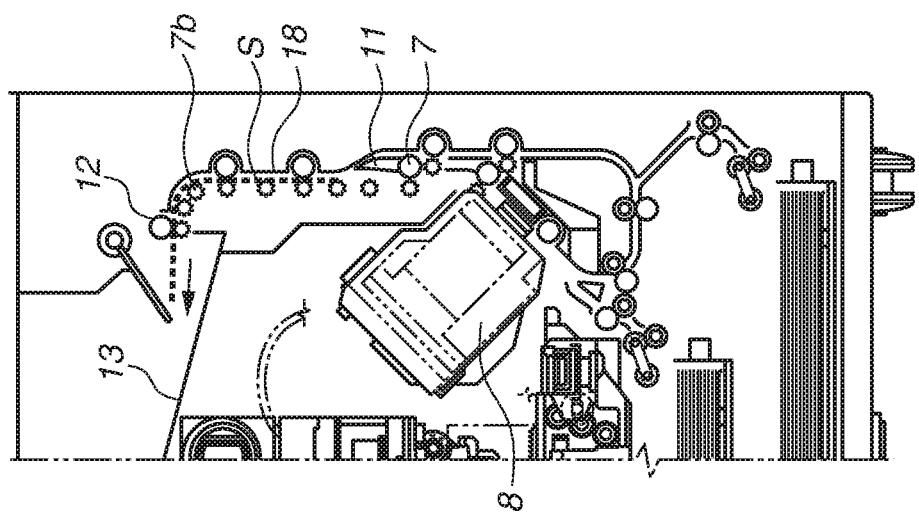
FIGS. 4A, 4B, and 4C illustrate example conveyance paths of a recording medium fed from a first cassette.
Figure 4B:
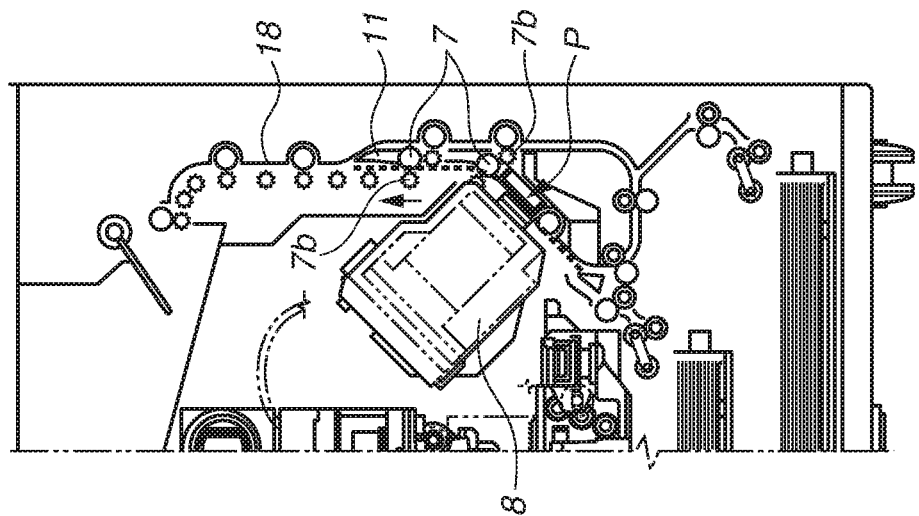
Figure 4A:
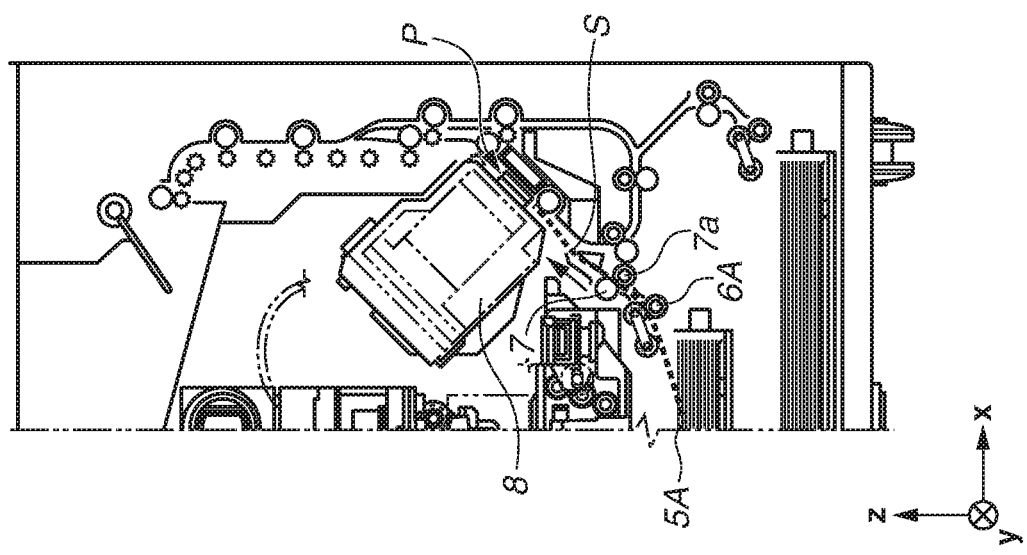

FIGS. 4A to 4C illustrate the conveyance path when the recording medium S of the A4 size stored in the first cassette 5A is fed. The recording medium S stacked on the top in the first cassette 5A is separated from the second and subsequent recording media by the first feeding unit 6A and then conveyed toward a printing area P between the platen 9 and the print head 8 while being nipped by the conveyance roller 7 and the pinch roller 7a. FIG. 4A illustrates a conveyance state immediately before the leading edge of the recording medium S reaches the printing area P. While the recording medium S is fed to the first feeding unit 6A and reaches the printing area P, the traveling direction of the recording medium S is changed from the horizontal direction (x direction) to a direction inclined by about 45 degrees with respect to the horizontal direction.

In the printing area P, ink is ejected from the plurality of discharge ports disposed on the print head 8 toward the recording medium S. The recording medium S in the area where ink is applied is supported by the platen 9 on the back surface so that the distance between the discharge port surface 8a and the recording medium S is kept constant. While being guided by the conveyance roller 7 and the spur roller 7b, the recording medium S with ink applied thereto passes through the left-hand side of the flapper 11 the reading edge of which is rightward inclined and is conveyed in the vertically upward direction for the printing apparatus 1 along the guide 18. FIG. 4B illustrates a state where the leading edge of the recording medium S passes through the printing area P and is conveyed in the vertically upward direction. The traveling direction of the recording medium S has been changed from the position of the printing area P inclined by about 45 degrees with respect to the horizontal direction to the vertically upward direction by the conveyance rollers 7 and the spur roller 7b.

After the recording medium S is conveyed in the vertically upward direction, the recording medium S is discharged onto the discharge tray 13 by the discharge roller 12 and the spur roller 7b. FIG. 4C illustrates a state where the leading edge of the recording medium S passes along the discharge roller 12 and the recording medium S is discharged onto the discharge tray 13. The recording medium S discharged is held on the discharge tray 13 in a state where the surface with an image printed thereon by the print head 8 is faced down.

The maintenance operation on the print head 8 will be described below. As illustrated in FIG. 1, the maintenance unit 16 according to the present example embodiment includes the cap unit 10 and the wiping unit 17 and operates these units at a predetermined timing to perform the maintenance operation.

Figure 5:
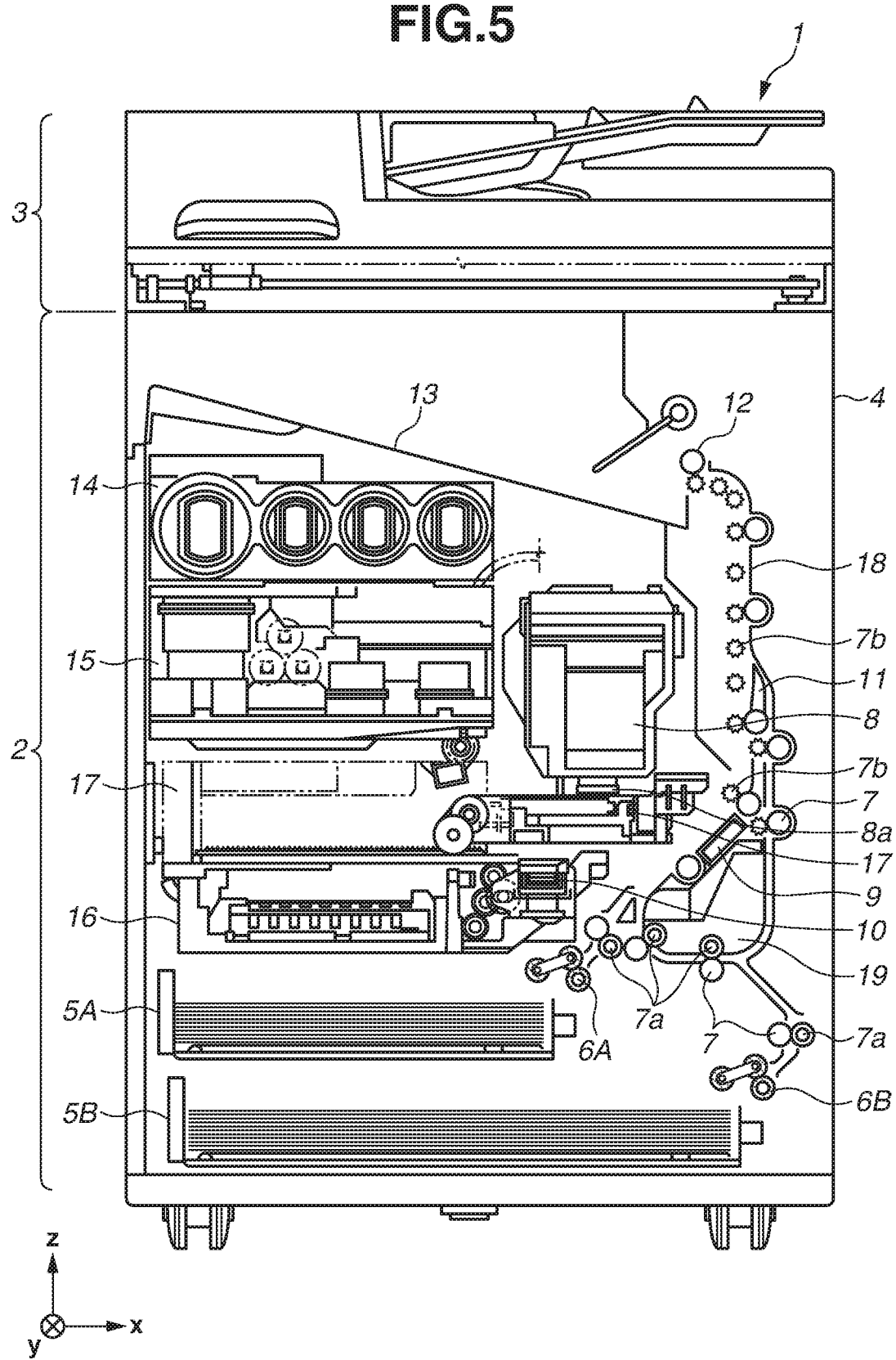
FIG. 5 illustrates an example internal configuration of the printing apparatus when the printing apparatus is in a maintenance state.

FIG. 5 illustrates an internal configuration of the printing apparatus 1 when the printing apparatus 1 is in the maintenance state. When moving the print head 8 from the standby position illustrated in FIG. 1 to the maintenance position illustrated in FIG. 5, the print controller 202 moves the print head 8 in the vertically obliquely upward direction and at the same time moves the cap unit 10 in the vertically downward direction. Then, the print controller 202 moves the wiping unit 17 from the evacuating position in the rightward direction illustrated in FIG. 5. Subsequently, the print controller 202 moves the print head 8 in the vertically downward direction to move the print head 8 to the maintenance position where maintenance operations can be performed.

On the other hand, when moving the print head 8 from the print position illustrated in FIG. 3 to the maintenance position illustrated in FIG. 5, the print controller 202 moves the print head 8 in the vertically upward direction while rotating the print head 8 by 45 degrees. Then, the print controller 202 moves the wiping unit 17 from the evacuating position in the rightward direction. Subsequently, the print controller 202 moves the print head 8 in the vertically downward direction to move the print head 8 to the maintenance position where maintenance operations can be performed by the maintenance unit 16.

When the print head 8 has moved to the maintenance position, the cap unit 10 collects ink ejected into a cap member (not illustrated) in preliminary discharge and a suction pump (not illustrated) sucks the collected ink. The wiping unit 17 wipes off ink adhering to the discharge port surface 8a. The maintenance operation is performed through such suction processing and wiping processing.

<Lock Control for Front Door 22>

Figure 17:
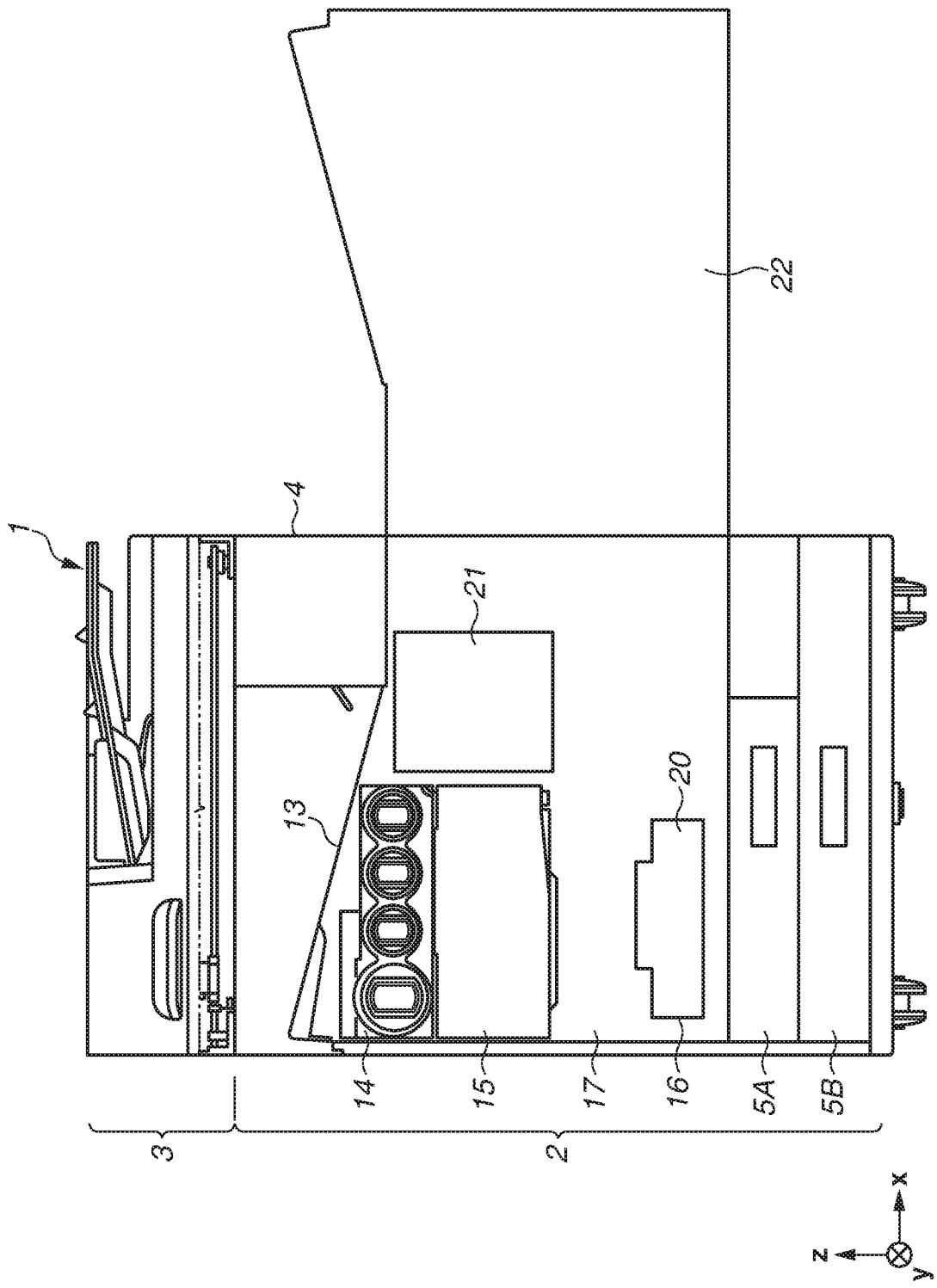
FIG. 17 illustrates an example outer appearance of the printing apparatus in a state where the front door is positioned at an open position.

The interior configurations of the printing unit 2 in FIGS. 1, 3, and 5 are covered by the exterior (housing of the printing apparatus 1). The exterior is provided with a front door 22 which is rotatable (openable) between the open position for opening the opening portion and the closed position for closing the opening portion. FIG. 17 illustrates the outer appearance of the printing apparatus 1 in a state where the front door 22 is positioned at the open position. When the front door 22 is positioned at the open position, the user can access the interior configurations of the printing unit 2 including chromatic color ink tanks attached to the ink tank unit 14, the MTC 20, and the print head 8 via the opening portion. More specifically, the user can perform maintenance operations for the interior configurations of the printing unit 2, such as replacement, repair, and cleaning, via the opening portion.

According to the present example embodiment, the front door 22 is locked and cannot be opened (cannot be moved from the closed position) until the user operates an "UNLOCK" button (described below). To open the front door 22, the user needs to operate the "UNLOCK" button to unlock the front door 22. When the front door 22 is once opened and then returned to the closed position again, the front door 22 is locked again.

A program for implementing at least one function of the printing apparatus 1 or the host apparatus 400 according to the present example embodiment may be supplied to a system or apparatus via a network or various storage media. Then, a computer (CPU or micro processing unit (MPU)) of the system or apparatus may read the program and perform a function or instruct various mechanisms to perform the function. The program may be executed by one computer or executed by a plurality of computers in an associative way. In addition, not all of the above-described processing needs to be implemented by software. A part or whole of the processing may be implemented by hardware such as an Application Specific Integrated Circuit (ASIC). In addition, one CPU do not necessarily perform the entire processing, i.e., a plurality of CPUs may suitably perform processing in a cooperative way. Alternatively, one CPU may perform any one piece of processing and a plurality of CPUs may perform other processing in a cooperative way.

As described above, according to the present example embodiment, in a state where the front door 22 is positioned at the open position, the user can manually operate the interior configurations of the printing unit 2 to perform maintenance operations for the interior configurations, such as replacement, repair, and cleaning, via the opening portion. However, while the interior configurations are operating during print operation or maintenance operation, it is desirable that the interior configurations are not subjected to user operations. Therefore, at least during operation of these interior configurations, it is desirable that the front door 22 remains locked to prevent the front door 22 from being opened.

It is desirable that preparation processing (described below) is performed before replacing an interior configuration of the printing unit 2. However, for example, in a form where the front door 22 is not constantly locked, an interior configuration of the printing unit 2 may be replaced in a state where the preparation processing has not been performed. Therefore, it is desirable that the front door 22 remains locked until a preparation operation is performed. On the other hand, in a form where the front door 22 is automatically unlocked at a timing when interior maintenance processing is to be performed and then the preparation processing is performed, for example, the preparation processing may be performed also when the user does not perform the maintenance processing at the timing. This means that the preparation processing may be uselessly performed. The preparation processing includes processing for writing data in a nonvolatile memory. In a case where the number of times of writing to the nonvolatile memory is limited (the nonvolatile memory has a writing life), uselessly performing the preparation processing will uselessly shorten the life of the nonvolatile memory.

The present example embodiment employs a form where the front door 22 remains locked. The front door 22 is configured not to be automatically unlocked without user operations. In this form, the front door 22 is unlocked and becomes openable when the printing apparatus 1 identifies that a user operation opening the front door 22 of the printing apparatus 1 has been performed. More specifically, when the printing apparatus 1 identifies that a user operation has been performed, the printing apparatus 1 can identify a timing when the user performs maintenance operations on the interior configurations of the printing unit 2 via the opening portion.

Although an openable configuration (opening and closing unit) to be locked and unlocked is the front door 22, the configuration is not limited to the form. For example, the openable configuration to be locked and unlocked may be a tray or drawer drawable from the printing apparatus 1. In this case, a state where the configuration is pulled out from the printing apparatus 1 is a state where the configuration is positioned at the open position, and a state where the configuration is pushed into the printing apparatus 1 is a state where the configuration is positioned at the closed position.

Figure 6A:
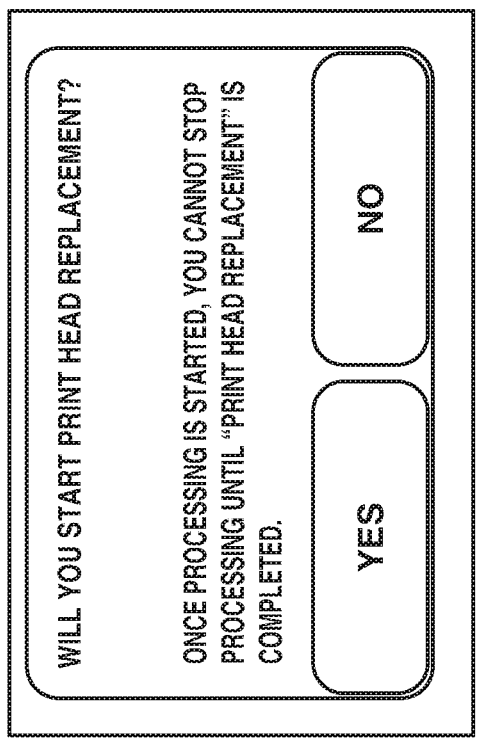
FIGS. 6A, 6B, 6C, and 6D are examples of screens displayed on an operation panel.

FIGS. 6A, 6B, 6C, and 6D illustrate examples of screens displayed on the operation panel 104. FIG. 6A illustrates an example of a screen for notifying the user of an out-of-ink error, i.e., an error indicating that the ink included in the printing apparatus 1 has run out. The ink of the printing apparatus 1 will run out in the course of print operation or maintenance operation. When the out-of-ink error occurs, the printing apparatus 1 interrupts print operation or maintenance operation and displays the screen illustrated in FIG. 6A on the operation panel 104. The screen illustrated in FIG. 6A is an example of a screen for displaying an error notifying the user that black and cyan ink has run out. When the user presses the "NEXT" button in the screen illustrated in FIG. 6A, the printing apparatus 1 displays the unlock screen illustrated in FIG. 6B on the operation panel 104.

The unlock screen is a screen for receiving the user operation (unlock operation) for opening the front door 22. The unlock screen is displayed at this timing because the user needs to open the front door 22 (move the front door 22 to the open position) to replace ink tanks.

Figure 6C:
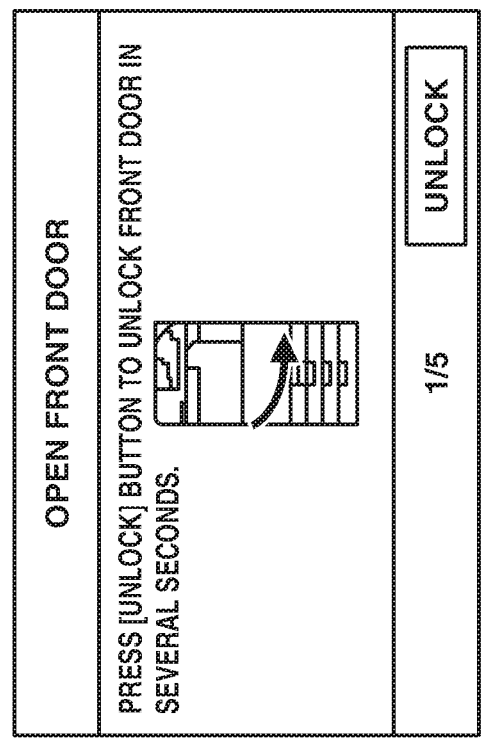
Figure 6B:
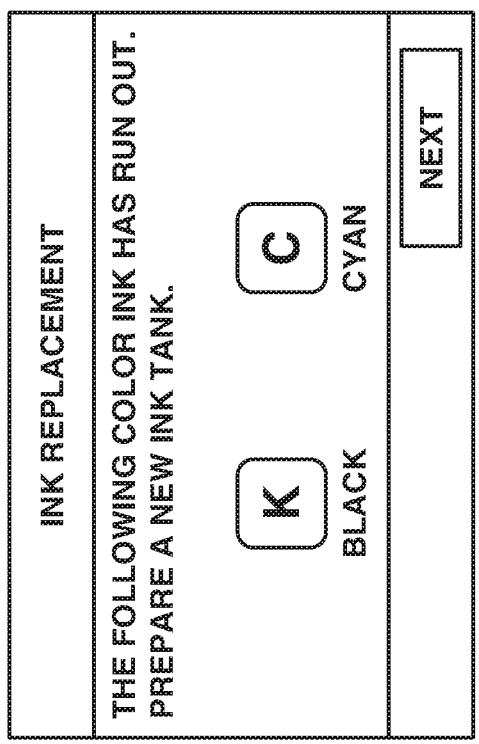

When the user presses the "UNLOCK" button in the screen illustrated in FIG. 6B, the printing apparatus 1 first performs ink replacement preparation processing before the front door 22 is unlocked and the ink tanks are replaced. The ink replacement preparation processing includes processing for writing information about the ink tanks, such as information about the remaining amount of ink, to the nonvolatile memory area of the ink tanks. The ink replacement preparation processing also includes processing for preventing air from entering the ink supply flow channel even after a supply valve (not illustrated) for supplying ink from the ink tanks is closed and the ink tanks are removed.

When the front door 22 is opened, not only the ink tanks but also the MTC 20 can be replaced. Therefore, when the ink replacement preparation processing is performed, MTC replacement preparation processing is also performed. The MTC replacement preparation processing is, for example, processing for writing information about the MTC 20, such as information about the amount of ink included in the MTC 20, to the nonvolatile memory area. When the user presses the "UNLOCK" button in the screen illustrated in FIG. 6B, the head replacement preparation processing (described below) is not performed. This is because the head cover for covering the print head 8 is prevented from being opened and the print head 8 is prevented from moving to the head replacement position although the front door 22 is opened when the user presses the "UNLOCK" button in the screen illustrated in FIG. 6B.

According to the present example embodiment, the ink replacement preparation processing and the MTC replacement preparation processing are performed when the user presses the "UNLOCK" button in the screen illustrated in FIG. 6B. The front door 22 is unlocked after completion of each piece of preparation processing. Therefore, the area for notifying the user of the time required for each piece of preparation processing and the area for notifying the user that the front door 22 is not unlocked are included in the screen illustrated in FIG. 6B. The timing and condition for starting each piece of preparation processing are not limited to the above-described form. For example, each piece of preparation processing may be started when the user presses the "NEXT" button in the screen illustrated in FIG. 6A or when the out-of-ink error occurs. The unlock screen illustrated in FIG. 6B for ink tank replacement includes an area indicating the ink tank replacement.

FIG. 6C illustrates an example of a screen for making an inquiry to the user about whether to perform processing for replacing the print head 8. At an arbitrary timing for replacing the print head 8, the user can display the screen illustrated in FIG. 6C on the operation panel 104 by operating a setting screen of the printing apparatus 1 displayed on the operation panel 104. When the user presses the "NO" button, the printing apparatus 1 returns the screen displayed on the operation panel 104 to a setting screen displayed before the screen illustrated in FIG. 6C was displayed, without performing the head replacement preparation processing or displaying the unlock screen illustrated in FIG. 6D. On the other hand, when the user presses the "YES" button, the printing apparatus 1 displays the unlock screen illustrated in FIG. 6D on the operation panel 104.

Figure 6D:
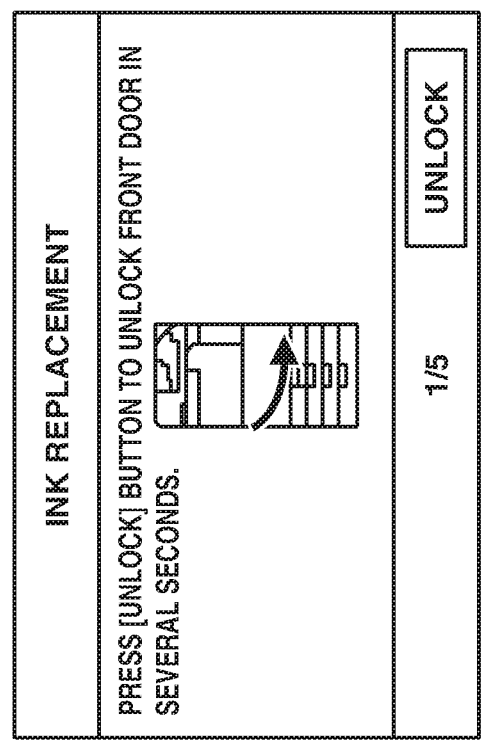

When the user presses the "UNLOCK" button in the screen illustrated in FIG. 6D, the printing apparatus 1 performs the head replacement preparation processing before the front door 22 is unlocked and the print head 8 is replaced. The head replacement preparation processing includes processing for collecting the ink remaining in the print head 8 to a sub-tank and closing the ink valve for supplying ink to the print head 8 to prevent ink supply to the print head 8. The head replacement preparation processing also includes processing for writing a usage history of nozzles arranged on the print head 8, time when power of the print head 8 is turned ON, and information about errors occurred in the print head 8 to the nonvolatile memory area of the print head 8. The head replacement preparation processing also includes processing for opening the head cover to be opened to replace the print head 8, and processing for moving the print head 8 to the head replacement position. When the front door 22 is opened, the ink tanks and the MTC 20 can be replaced. Therefore, when the head replacement preparation processing is performed, the ink replacement preparation operation and the MTC replacement preparation operation are also performed. According to the present example embodiment, each piece of preparation processing is performed when the user presses the "UNLOCK" button in the screen illustrated in FIG. 6D. The front door 22 is unlocked after completion of each piece of replacement preparation processing. Therefore, the area for notifying the user of the time required to perform each piece of replacement preparation processing and the area for notifying the user that the front door 22 is not unlocked are included in the screen illustrated in FIG. 6D. The timing and condition for starting the head replacement preparation processing are not limited to the above-described form. The head replacement preparation processing may also be started, for example, when the user presses the "YES" button in the screen illustrated in FIG. 6C. The head replacement preparation processing may also be started, for example, based on a user operation in a screen displayed before the screen illustrated in FIG. 6C is displayed.

In this way, according to the present example embodiment, the user needs to press the "UNLOCK" button to open the front door 22. Various preparation operations are performed when a user operation related to unlocking is performed. Using such a form enables preventing each piece of preparation operation from being performed, for example, even if the user does not open the front door 22 or perform the maintenance for the interior configurations of the printing apparatus 1.

Although a form where the ink tank replacement is performed when an ink tank error occurs has been described above, the form is not limited thereto. Like the above-described head replacement, the user may perform the ink tank replacement at an arbitrary timing when the user wants to replace the ink tanks. More specifically, the user may display the screen illustrated in FIG. 6B on the printing apparatus 1 at an arbitrary timing by operating a setting screen of the printing apparatus 1 displayed on the operation panel 104. The head replacement may be performed if a head error occurs. More specifically, the printing apparatus 1 may display the screens illustrated in FIGS. 6C and 6D when a head error occurs. The unlock screen for replacing the MTC 20 may be displayed when an MTC error occurs or when the user operates a setting screen of the printing apparatus 1 displayed on the operation panel 104 at an arbitrary timing when the user wants to replace the MTC 20.

For example, if an MTC error and an ink tank error occur at the same time or during initial setting, both the MTC 20 and the ink tanks need to be replaced. In this case, the printing apparatus 1 displays the unlock screen for replacing the MTC 20 and the unlock screen for replacing the ink tanks at different timings. More specifically, the printing apparatus 1 displays the unlock screen for replacing the MTC 20 to prompt the user to replace the MTC 20. Thus, when the MTC 20 has been replaced and the front door 22 has been closed, the printing apparatus 1 locks the front door 22. Subsequently, the printing apparatus 1 displays the unlock screen for replacing the ink tanks to prompt the user to replace the ink tanks. The printing apparatus 1 first prompts the user to replace the MTC 20 in order that the MTC 20 collects ink flowing during ink replacement. If not only the MTC 20 but also the ink tanks have been replaced when the front door 22 is opened via the unlock screen for replacing the MTC 20, the printing apparatus 1 does not need to display the unlock screen for replacing the ink tanks.

When the print head 8 is replaced and the front door 22 is locked after completion of the head replacement preparation processing, the printing apparatus 1 performs preparation processing for using the print head 8. More specifically, ink is supplied from the ink tanks to the print head 8. The preparation processing requires the remaining capacity of ink supplied from the ink tanks and the remaining capacity of the MTC 20 for collecting waste ink generated during ink supply from the ink tanks. Therefore, before the head replacement preparation processing, the printing apparatus 1 may confirm the remaining amount of ink stored in the ink tanks and the remaining capacity of waste ink storable by the MTC 20 to determine whether a no-remaining-amount error has occurred in the ink tanks and the MTC 20. If a no-remaining-amount error has occurred, the printing apparatus 1 may display the unlock screen replacing the ink tanks or the unlock screen for replacing the MTC 20 to replace the configuration in which the error has occurred. After the user has replaced the ink tanks or the MTC 20 and confirmed that a no-remaining-amount error does not occur in the ink tanks and the MTC 20, the unlock screen for replacing the head is displayed.

The unlock screen may be displayed not only during error occurrence and setting screen operations, as described above, but also at other timings. According to the present example embodiment, for example, the unlock screen is displayed during initial setting and transportation mode setting.

Although, in the present example embodiment, the unlock operation is an operation for a soft button displayed on the operation panel 104, the unlock operation is not limited to the form. For example, if the printing apparatus 1 includes a hard button for receiving the unlock operation, the unlock operation may be an operation for the hard button. In the form, for example, an operation for the hard button may be disabled during printing by the printing apparatus 1. The unlock operation is an operation performed for configurations other than the door of the printing apparatus 1, and may be an operation detectable by the printing apparatus 1.

Figure 7:
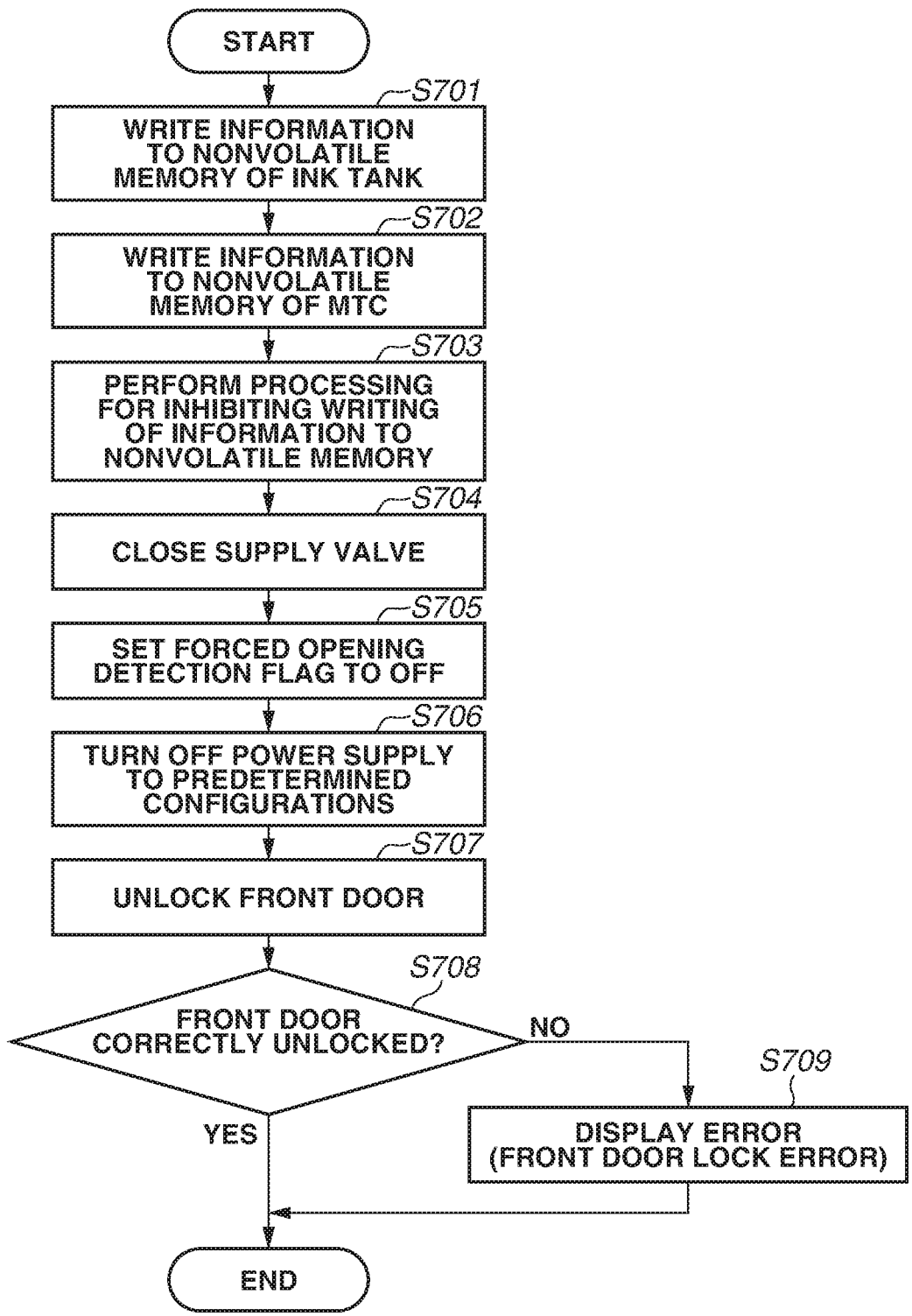
FIG. 7 is a flowchart illustrating example processing for unlocking a front door to be performed by the printing apparatus.

FIG. 7 is a flowchart illustrating processing for unlocking the front door 22 performed by the printing apparatus 1. The processing of the flowchart is started when the depression of the "UNLOCK" button is received in the unlock screen illustrated in FIG. 6B. The processing of the flowchart is implemented when the main controller 101 loads a program stored in a memory such as the ROM 107 into the RAM 106 and then executes the program.

In step S701, the printing apparatus 1 starts the ink replacement preparation processing. More specifically, the printing apparatus 1 first writes information about the ink tanks to the nonvolatile memory included in each ink tank.

In step S702, the printing apparatus 1 starts the MTC replacement preparation processing. More specifically, the printing apparatus 1 first writes information about the MTC 20 to the nonvolatile memory included in the MTC 20.

In step S703, the printing apparatus 1 performs processing for inhibiting writing of information to the nonvolatile memory included in each ink tank and the nonvolatile memory included in the MTC 20. This processing aims to prevent a write data failure which may occur in the case where the user replaces the ink tanks and the MTC 20 while information is written to the nonvolatile memory, In step S704, the printing apparatus 1 closes all of the supply valves to prevent air from entering the ink supply flow channel when the ink tanks are removed.

In step S705, to set the front door 22 in the openable state, the printing apparatus 1 performs control to prevent forced opening detection processing (described below) from being performed. More specifically, the printing apparatus 1 sets a forced opening detection flag to OFF.

In step S706, the printing apparatus 1 stops power supply to predetermined configurations included in the printing apparatus 1. More specifically, the predetermined configurations include the configurations related to the recording medium conveyance (configurations illustrated in FIGS. 4A, 4B, and 4C) and the configurations related to maintenance operations (the wiping unit 17, the maintenance unit 16, and the cap unit 10). The processing prevents the print, conveyance, and maintenance operations from being performed while the front door 22 is opened and the user is operating the interior configurations of the printing apparatus 1, thus improving user's safety, In step S707, the printing apparatus 1 unlocks the front door 22. More specifically, the printing apparatus 1 performs control to set the front door 22 in the openable state. In this case, the printing apparatus 1 automatically may not only unlock the front door 22 but also move the front door 22 to the open position (without user operations).

In step S708, the printing apparatus 1 determines whether the front door 22 is correctly unlocked after the unlock processing in step S707. The processing is performed because, even if the unlock processing in step S707 is performed, the front door 22 may not be correctly unlocked because of a failure of a lock motor having a function of locking the front door 22. When the printing apparatus 1 determines that the front door 22 is correctly unlocked (YES in step S708), the processing ends. On the other hand, when the printing apparatus 1 does not determine that the front door 22 is correctly unlocked (NO in step S708), the processing proceeds to step S709.

In step S709, the printing apparatus 1 notifies the user that an unlock error of the front door 22 has occurred (the front door 22 is not correctly unlocked and the front door 22 is not set in the operable state). More specifically, the printing apparatus 1 displays on the operation panel 104 a screen for notifying the user that an unlock error of the front door 22 has occurred. Then, the processing ends.

When the depression of the "UNLOCK" button is received in the unlock screen illustrated in FIG. 6D, the head replacement preparation processing is started, for example, before step S701. It is desirable that the head replacement preparation processing is performed after the MTC preparation processing for the following reason. When processing for discharging the ink remaining in the print head 8 is performed in the head replacement preparation processing, the MTC 20 may be used. In this case, the head replacement preparation processing is not completed if the amount of ink stored in the MTC 20 exceeds a permissible value. In step S703, the printing apparatus 1 sets write-inhibition on the nonvolatile memory included in the print head 8.

According to the present example embodiment, when the printing apparatus 1 does not determine that the front door 22 is correctly unlocked (NO in step S708) at least once, the printing apparatus 1 notifies the user of an error in step S709. However, the form is not limited thereto. Even when the printing apparatus 1 does not determine that the front door 22 is correctly unlocked (NO in step S708), the printing apparatus 1 tray repeat the determination processing in step S708. When the printing apparatus 1 does not determine that the front door 22 is correctly unlocked (NO in step S708) the predetermined number of times, the printing apparatus 1 may notifies the user of an error in step S709.

According to the present example embodiment, the printing apparatus 1 performs various preparation operations in this way when the user has performed the unlock operation. Such a form enables preventing the printing apparatus 1 from uselessly performing the preparation operation in comparison with the form where the preparation operation is automatically performed without receiving user operations.

Figure 8:
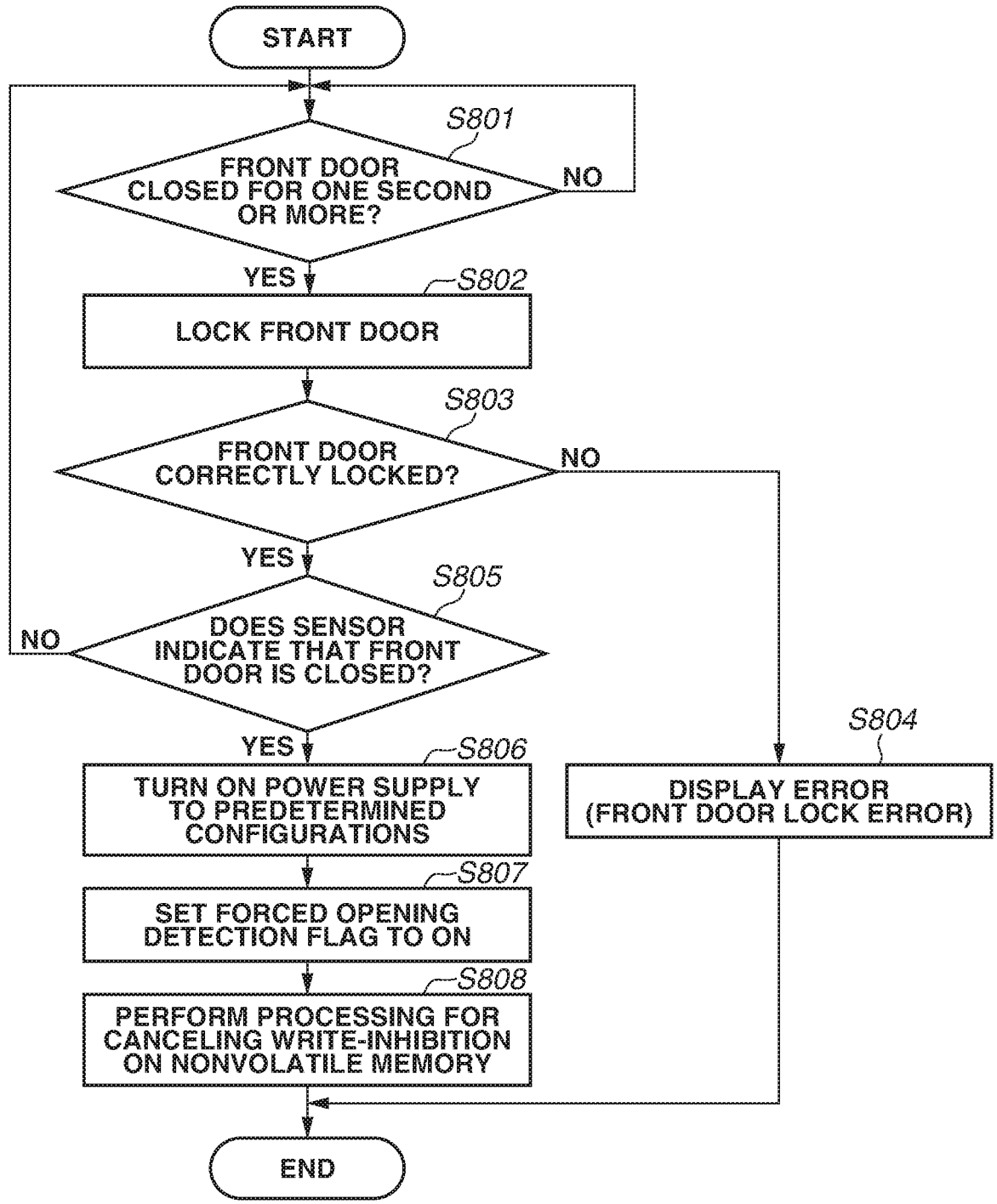
FIG. 8 is a flowchart illustrating example processing for locking the front door to be performed by the printing apparatus.

FIG. 8 is a flowchart illustrating processing for locking the front door 22 performed by the printing apparatus 1. The processing of the flowchart is started when the front door 22 is opened (moved to the open position) and then closed again (moved to the closed position). More specifically, the printing apparatus 1 includes an opening and closing sensor (not illustrated) capable of detecting the opening and closing state of the front door 22. The processing of the flowchart is started when the opening and closing sensor detects that the front door 22 has been closed. The processing of the flowchart is implemented when the main controller 101 loads a program stored in a memory such as the ROM 107 into the RAM 106 and then executes the program.

In step S801, based on the output obtained from the opening and closing sensor, the printing apparatus 1 determines whether the front door 22 has been closed (positioned at the closed position) for a predetermined time period (one second) or longer. When the printing apparatus 1 determines that the front door 22 has been closed for a predetermined time period or longer (YES in step S801), the processing proceeds to step S802. On the other hand, when the printing apparatus 1 does not determine that the front door 22 has been closed for a predetermined time period or longer (NO in step S801), the processing returns to step S801.

In step S802, the printing apparatus 1 locks the front door 22. More specifically, the printing apparatus 1 performs control such that the front door 22 is not opened by a user manual operation for the front door 22.

In step S803, the printing apparatus 1 determines whether the front door 22 has been correctly locked. This processing is performed because, even if the lock processing in step S802 is performed, the front door 22 may not correctly locked because of a failure of the lock motor having a function of locking the front door 22. When the printing apparatus 1 determines that the front door 22 has been correctly locked (YES in step S803), the processing proceeds to step S805. On the other hand, when the printing apparatus 1 does not determine that the front door 22 has been correctly locked (NO in step S803), the processing proceeds to step S804.

In step S804, the printing apparatus 1 notifies the user that a lock error of the front door 22 has occurred (the front door 22 is not correctly locked and is in the openable state). More specifically, the printing apparatus 1 displays on the operation panel 104 a screen for notifying the user that a lock error of the front door 22 has occurred. Then, the processing ends.

In step S805, based on the output obtained from the opening and closing sensor, the printing apparatus 1 determines whether the front door 22 is closed. The processing is performed because the front door 22 may possibly be opened and closed by a user operation on the front door 2 in the processing in steps S801 to S803. When the printing apparatus 1 determines that the front door 22 is closed (YES in step S805), the processing proceeds to step S806. On the other hand, when the printing apparatus 1 does not determine that the front door 22 is closed (NO in step S805), the printing apparatus 1 detects that the front door 22 has been closed, and the processing returns to step S801.

In step S806, the printing apparatus 1 resumes power supply to predetermined configurations included in the printing apparatus 1. More specifically, the predetermined configurations include the configurations related to the recording medium conveyance (configurations illustrated in FIGS. 4A, 4B, and 4C) and the configurations related to maintenance operations (the wiping unit 17, the maintenance unit 16, and the cap unit 10). This enables the printing apparatus 1 to perform print, conveyance, and maintenance operations again. For example, when doors to be unlocked by the unlock operation exist in addition to the front door 22, the printing apparatus 1 may detect whether these doors are also locked. Then, power supply may be resumed when all of the doors have been locked.

In step S807, the printing apparatus 1 performs control such that forced opening detection processing (described below) is performed. More specifically, the printing apparatus 1 sets the forced opening detection flag to ON.

In step S808, the printing apparatus 1 performs processing for canceling write-inhibition (processing for permitting writing) on the nonvolatile memory included in each ink tank and the nonvolatile memory included in the MTC 20. Subsequently, the processing ends.

Subsequently, for example, the printing apparatus 1 may determine whether the ink tanks, the MTC 20, and the print head 8 are correctly attached to the printing apparatus 1 or whether an error is canceled. When the printing apparatus 1 does not determine that the ink tanks, the MTC 20, and the print head 8 are correctly attached, or that an error is canceled, the printing apparatus 1 may display the unlock screen again.

Figure 16:
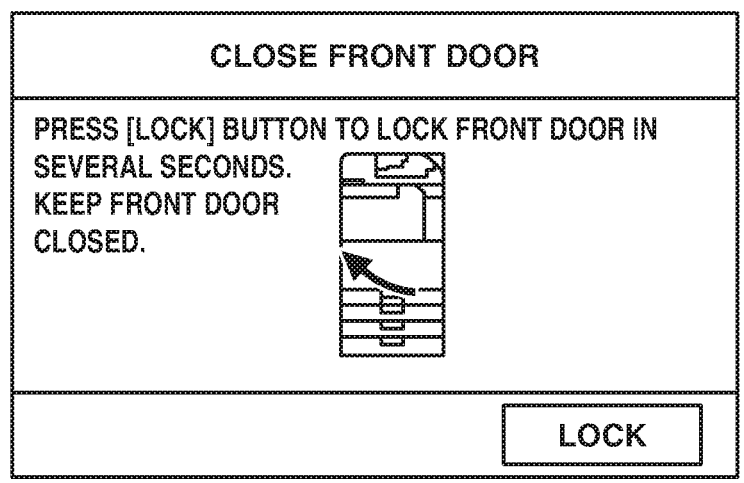
FIG. 16 illustrates an example lock screen.

Although the printing apparatus 1 automatically locks the front door 22 in step S802, the form is not limited thereto. For example, when the printing apparatus 1 displays a lock screen as illustrated in FIG. 16 and the user performs a lock operation for the lock screen in step S802, the printing apparatus 1 may lock the front door 22. The processing is performed because, even after the front door 22 is closed, the user may open the front door 22 again to perform maintenance operations.

<Transportation Preparation Processing>

According to the present example embodiment, the printing apparatus 1 performs transportation preparation processing according to a user instruction before the printing apparatus 1 is transported. The transportation preparation processing refers to processing for preparing for vibration during transportation of the printing apparatus 1.

Figure 9:
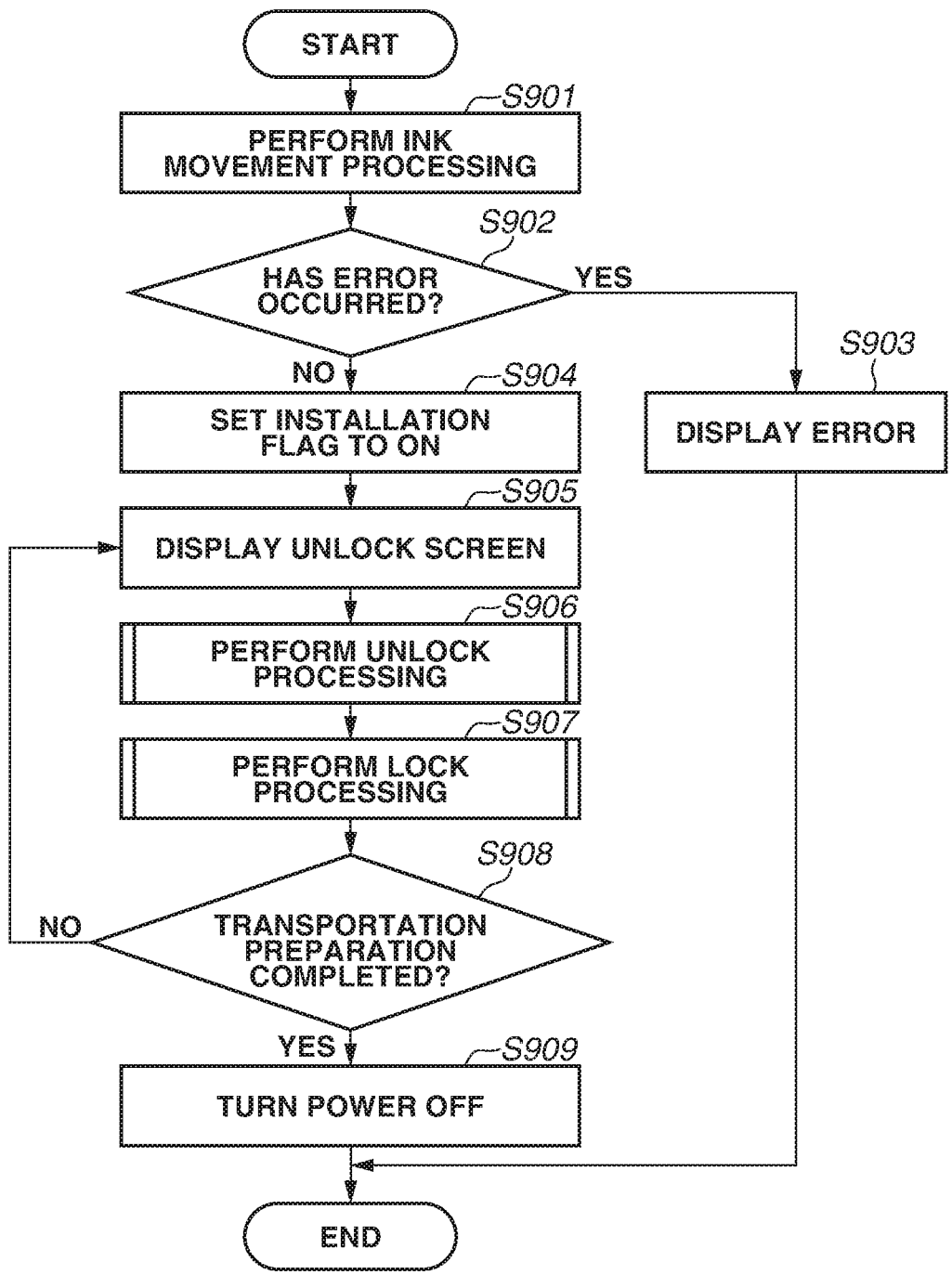
FIG. 9 is a flowchart illustrating example transportation preparation processing to be performed by the printing apparatus.

FIG. 9 is a flowchart illustrating the transportation preparation processing performed by the printing apparatus 1. The processing of the flowchart is started when a user operation for transportation preparation is performed on a menu screen (not illustrated).

In step S901, the printing apparatus 1 moves the ink remaining in the print head 8 and the ink supply channel to the print head 8, to the sub-tank or the MTC 20. User operations for transportation preparation may include an operation for setting the transportation level. Setting the transportation level refers to processing for setting whether transportation to be performed by the user is transportation during which the printing apparatus 1 is not in use for a prolonged time period or transportation during which the printing apparatus 1 is not in use for a short time period. The former setting is referred to a long-term setting, and the latter setting is referred to as a short-term setting. In the ink movement in step S901, different processing may be performed based on the transportation level setting. More specifically, when the transportation level setting is the long-term setting, the printing apparatus 1 may move all of the ink remaining in the print head 8 and the ink supply channel to the print head 8, to the sub-tank or the MTC 20. When the transportation level setting is the short-term setting, the printing apparatus 1 may move part of the ink remaining in the print head 8 and the ink supply channel to the print head 8, to the sub-tank or the MTC 20.

In step S902, the printing apparatus 1 determines whether an error has occurred in the ink movement processing in step S901. If the configuration for moving ink has trouble, an error may occur, indicating that the ink remaining in the print head 8 and the ink supply channel to the print head 8 cannot be normally moved to the sub-tank or the MTC 20. More specifically, for example, an error occurs if the amount of ink in the sub-tank or the MTC 20 exceeds the permissible vale. When the printing apparatus 1 determines that an error has occurred (YES in step S902), the processing proceeds to step S903. On the other hand, when the printing apparatus 1 does not determine that an error has occurred (NO in step S902), the processing proceeds to step S904.

In step S903, the printing apparatus 1 notifies the user that an error has occurred in the ink movement processing. More specifically, the printing apparatus 1 displays a screen for notifying the user that an error has occurred in the ink movement processing, on the operation panel 104. Subsequently, the printing apparatus 1 ends the processing without setting an installation flag (described below) to ON. At this timing, to cancel the error, the printing apparatus 1 may display the unlock screen to prompt the user to cancel the error.

Figure 15:
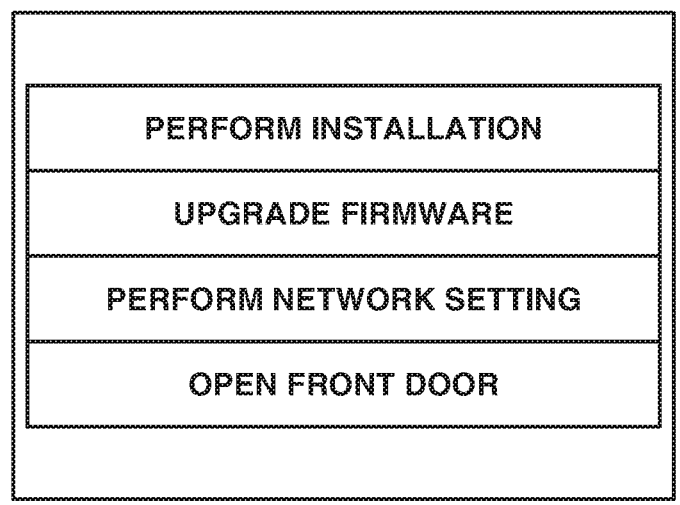
FIG. 15 illustrates an example initial setting screen.

In step S904, the printing apparatus 1 sets the installation flag to ON. The flag is referenced by the printing apparatus 1 when power of the printing apparatus 1 is turned ON. When the installation flag referenced when power is turned ON is ON, the printing apparatus 1 displays the screen (described below) illustrated in FIG. 15 and performs installation processing. On the other hand, when the installation flag referenced when power is turned ON is OFF, the printing apparatus 1 returns ink to the print head 8 and the ink supply channel and returns the printing apparatus 1 to the printable state without performing the installation processing.

In step S905, the printing apparatus 1 displays the unlock screen and receives the unlock operation from the user.

In step S906, the printing apparatus 1 performs the unlock processing illustrated in FIG. 7. When the front door 22 is unlocked in step S906, the user removes the ink tanks, the MTC 20, and the print head 8 and attaches a carriage fixing member for fixing the carriage to which the print head 8 is to be attached. When the unlock operation is received, the printing apparatus 1 moves the carriage and the print head 8 attached to the carriage to a predetermined position for attaching the carriage fixing member and then unlocks the front door 22. Subsequently, the printing apparatus 1 detects that the front door 22 has been closed by the user.

In step S907, the printing apparatus 1 performs the lock processing illustrated in FIG. 8.

In step S908, the printing apparatus 1 determines whether the transportation preparation is completed. More specifically, the printing apparatus 1 determines whether the removal of the ink tanks, the MTC 20, and the print head 8 and the attachment of the carriage fixing member for fixing the carriage to which the print head 8 is to be attached are completed. When the printing apparatus 1 determines that the transportation preparation is completed (YES in step S908), the processing proceeds to step S909. On the other hand, when the printing apparatus 1 does not determine that the transportation preparation is completed (NC) in step S908), the processing returns to step S905.

As described above, when power is turned ON, the printing apparatus 1 references the ON/OFF state of the installation flag. When power of the printing apparatus 1 is turned ON for the first time after completion of the transportation preparation processing illustrated in FIG. 9, the installation flag is ON. When the installation flag is ON, the ink tank, the MTC 20, and the print head 8 have been removed from the printing apparatus 1, and the carriage fixing member for fixing the carriage to which the print head 8 is to be attached has been attached to the printing apparatus 1. Therefore, to use the functions of the printing apparatus 1, the user needs to perform the initial setting for the printing apparatus 1 again. When the referenced installation flag is ON, the printing apparatus 1 displays the initial-setting screen illustrated in FIG. 15.

The initial setting screen includes an area for performing the installation (initial setting), an area for updating the firmware of the printing apparatus 1, an area for performing network setting on the printing apparatus 1, and an area for unlocking the front door 22. When the area for unlocking the front door 22 is operated, the printing apparatus 1 displays the unlock screen. For example, power of the printing apparatus 1 may be turned OFF in the middle of the preparation processing illustrated in FIG. 9 (in a state where the removal of the ink tank, the MTC 20, and the print head 8 and the attachment of the carriage fixing member are not completed). In this case, after turning ON power of the printing apparatus 1, the user can press the area for unlocking the front door 22 to open the front door 22 and continue the above-described preparation processing.

When the user presses the area for performing the installation (initial setting), the printing apparatus 1 displays the unlock screen. Then, upon reception of the unlock operation from the user, the printing apparatus 1 displays an instruction screen for prompting the user to attach the ink tanks, the MTC 20, and the print head 8 and remove the carriage fixing member, on the operation panel 104. Subsequently, the printing apparatus 1 performs the unlock processing. Following the instruction screen, the user opens the front door 22, attaches the ink tanks, the MTC 20, and the print head 8, and removes the carriage fixing member. When the user closes the front door 22 to complete the lock processing illustrated in FIG. 8, the printing apparatus 1 determines whether the attachment of the ink tanks, the MTC 20, and the print head 8 and the removal of the carriage fixing member are completed. When the printing apparatus 1 does not determine that the attachment of the ink tanks, the MTC 20, and the print head 8 and the removal of the carriage fixing member are completed, the printing apparatus 1 displays the unlock screen again. At this timing, the printing apparatus 1 may instruct the user to perform incomplete processing out of the attachment of the ink tanks, the MTC 20, and the print head 8 and the removal of the carriage fixing member. On the other hand, when the printing apparatus 1 determines that the attachment of the ink tanks, the MTC 20, and the print head 8 and the removal of the carriage fixing member are completed, the printing apparatus 1 performs the preparation processing for enabling the functions of the printing apparatus 1, such as filling of ink to the print head 8. When the printing apparatus 1 recovers from the transportation state in this way, the printing apparatus 1 becomes able to perform various functions (print, scan, and copy operations).

The initial setting screen is also displayed, for example, when the printing apparatus 1 is activated for the first time after shipment from the factory.

<Warning Processing (Notification Processing) in Locked State>

As described above, to prevent the front door 22 from being opened by a user manual operation on the front door 22, the printing apparatus 1 locks the front door 22 until it is unlocked by the unlock operation.

Figure 11:
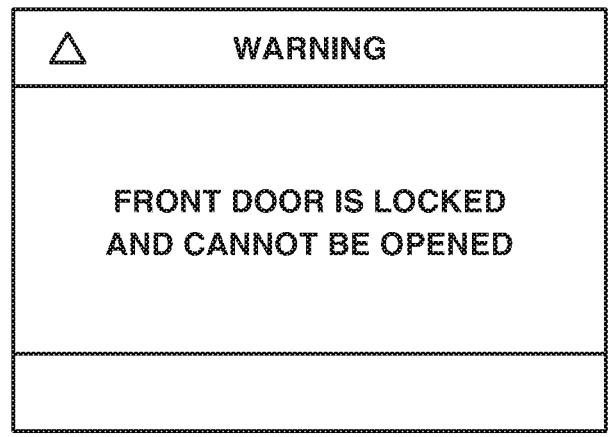
FIG. 11 illustrates an example warning screen.

However, while the front door 22 is locked, the user who does not know that the front door 22 is locked may perform an operation (open operation) for opening the front door 22, on the front door 22 (forced opening operation). If the forced opening operation is continued, the front door 22 may be damaged. Therefore, according to the present example embodiment, the printing apparatus 1 performs forced opening detection processing to detect whether the forced opening operation is performed. Then, when the printing apparatus 1 detects that the forced opening operation is performed, the printing apparatus 1 performs processing for warning the user that the front door 22 is locked. More specifically, when the forced opening operation is performed, the printing apparatus 1 generates a warning tone (notification tone) from a speaker (not illustrated). The printing apparatus 1 also notifies the user that the front door 22 is locked and displays a warning screen for prompting the user not to perform the open operation as illustrated in FIG. 11 on the operation panel 104. Subsequently, the printing apparatus 1 may display the unlock screen on the operation panel 104 or a screen for prompting the user to open the front door 22 via the unlock screen, on the operation panel 104.

According to the present example embodiment, the printing apparatus 1 changes the warning method according to the status of the printing apparatus 1.

Figure 10:
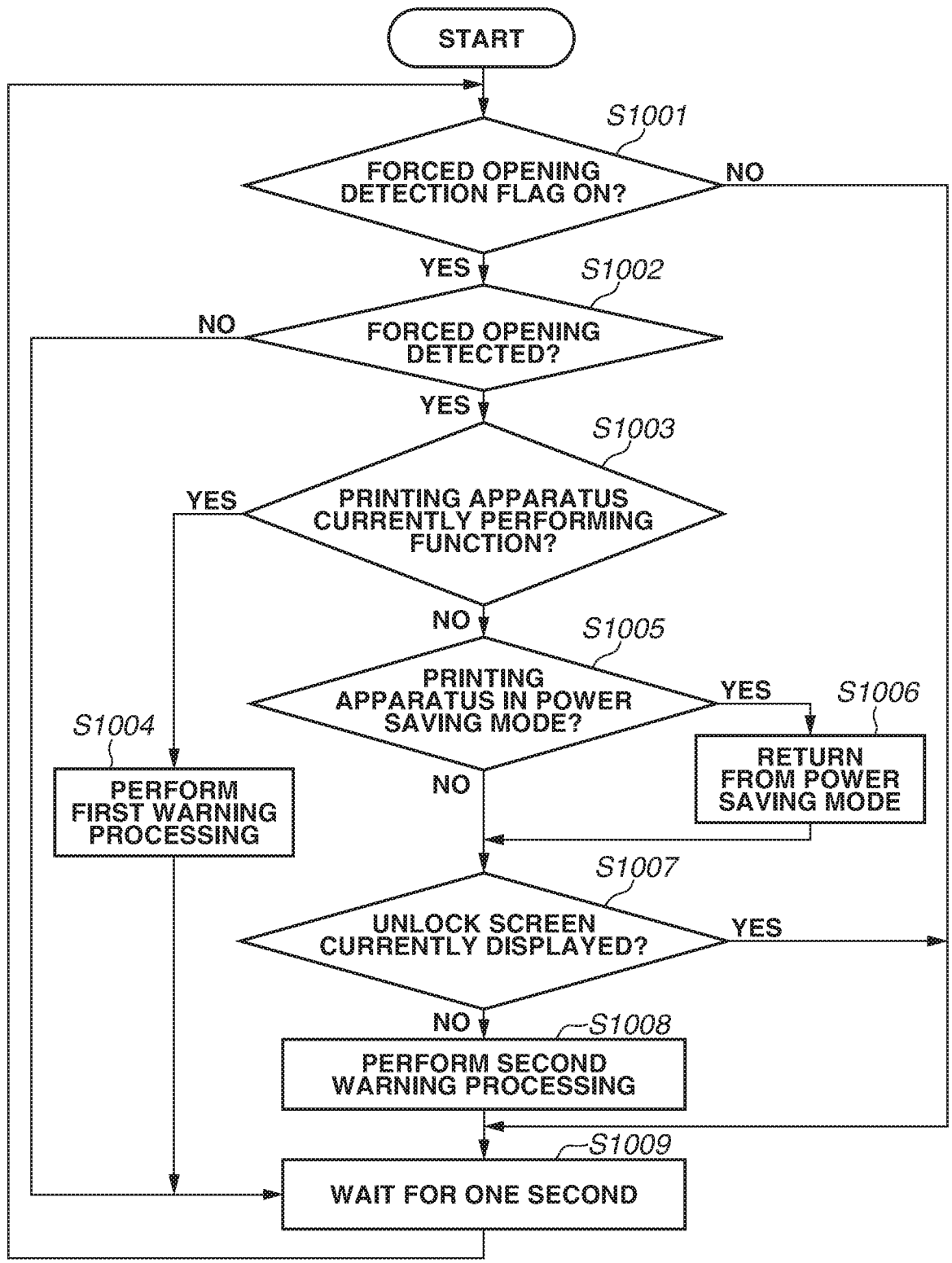
FIG. 10 is a flowchart illustrating example forced opening detection processing to be performed by the printing apparatus.

FIG. 10 is a flowchart illustrating the forced opening detection processing performed by the printing apparatus 1. The processing of the flowchart is started when the front door 22 is locked or when power of the printing apparatus 1 is turned ON while the front door 22 is locked. The processing of the flowchart is implemented when the main controller 101 loads a program stored in a memory such as the ROM 107 into the RAM 106 and then executes the program.

In step S1001, the printing apparatus 1 determines whether the printing apparatus 1 is controlled such that the forced opening detection processing is performed. More specifically, the printing apparatus 1 determines whether the forced opening detection flag is ON. When the printing apparatus 1 determines that the forced opening detection flag is ON (YES in step S1001), the processing proceeds to step S1002. On the other hand, when the printing apparatus 1 does not determine that the forced opening detection flag is ON (NO in step S1001), the processing proceeds to step S1009.

In step S1002, the printing apparatus 1 determines whether the user has performed the operation for opening the front door 22 (forced opening operation) while the front door 22 is locked. The printing apparatus 1 is assumed to be provided with a sensor for detecting that the opening and closing knob on the front door 22 is held. The printing apparatus 1 determines whether the forced opening operation has been performed, based on the output obtained from the detection sensor. The printing apparatus 1 performs the determination processing, for example, by detecting the minute opening of the front door 22 by using the above-described opening and closing sensor. When the printing apparatus 1 determines that the user has performed the forced opening operation (YES in step S1004 the processing proceeds to step S1003. On the other hand, when the printing apparatus 1 does not determine that the user has performed the forced opening operation (NO in step S1002), the processing proceeds to step S1009.

In step S1003, the printing apparatus 1 determines whether the printing apparatus 1 is currently performing a function. Examples of functions subjected to the determination processing include the print, scan, copy, and maintenance functions. When the printing apparatus 1 determines that the printing apparatus 1 is currently performing a function (YES in step S1003), the processing proceeds to step S1004. On the other hand, when the printing apparatus 1 does not determine that the printing apparatus 1 is currently performing a function (NO in step S1003), the processing proceeds to step S1005.

Figure 12:
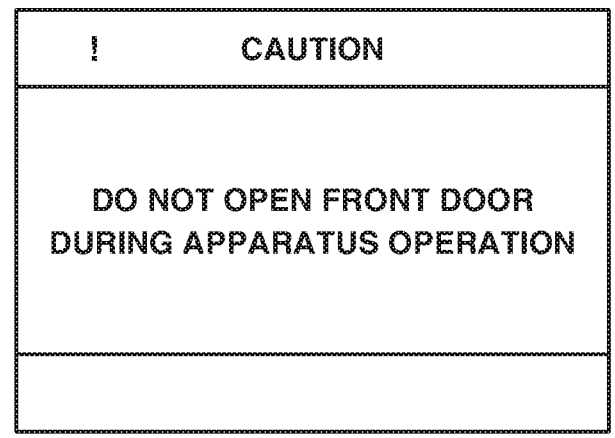
FIG. 12 illustrates another example warning screen.

In step S1004, the printing apparatus 1 performs first warning processing. The first warning processing refers to processing for generating a warning tone with a sound volume larger than that of a warning tone generated in second warning processing (described below), and processing for notifying the user that the front door 22 is locked and displaying a warning screen for prompting the user to stop the forced opening operation on the operation panel 104. The first warning processing may be processing for generating a warning tone for a time period longer than the generation time of a warning tone generated in the second warning processing (described below). The warning screen displayed in the first warning processing may differ from the warning screen displayed in the second warning processing. For example, the warning screen illustrated in FIG. 12 for warning the user not to perform the forced opening operation during execution of a function may be displayed in the first warning processing, and the warning screen illustrated in FIG. 11 may be displayed in the second warning processing. Each warning screen may automatically disappear when a predetermined time period (for example, 2 seconds) has elapsed or may disappear when the user performs an operation for closing the warning screen. Further, each screen may be displayed only while the detection sensor is detecting the forced opening operation. This also applies to the timing for stopping the warning tone.

In step S1005, the printing apparatus 1 determines whether the printing apparatus 1 is in the power saving mode (standby state). The power saving mode refers to a state where the printing apparatus 1 stops or reduces power supply to at least a part of configurations included in the printing apparatus 1 to provide lower power consumption than in the normal power mode in which the printing apparatus 1 can perform various functions (print, scan, and copy functions). According to the present example embodiment, the power saving mode refers to a state where power supply to the operation panel 104 is stopped, no screen is displayed on the operation panel 104, and various functions are not performed. When the printing apparatus 1 determines that the printing apparatus 1 is in the power saving mode (YES in step S1005), the processing proceeds to step S1006. On the other hand, when the printing apparatus 1 does not determine that the printing apparatus 1 is in the power saving mode (NO in step S1005), the processing proceeds to step S1007.

In step S1006, the printing apparatus 1 makes a state transition from the power saving mode to the normal power mode. More specifically, the printing apparatus 1 restarts power supply to the configurations to which power supply has been stopped. Thus, the printing apparatus 1 becomes able to display a screen on the operation panel 104 and generate a warning tone.

In step S1007, the printing apparatus 1 determines whether the unlock screen is currently displayed. When the printing apparatus 1 determines that the unlock screen is currently displayed (YES in step S1007), the processing proceeds to step S1009. On the other hand, when the printing apparatus 1 does not determine that the unlock screen is currently displayed (NO in step S1007), the processing proceeds to step S1008. In the determination processing, the printing apparatus 1 may determine whether an error notification screen as illustrated in FIG. 6A or a replacement screen as illustrated in FIG. 6C is currently displayed.

In step S1008, the printing apparatus 1 performs the second warning processing. The second warning processing refers to processing for generating a warning tone with a sound volume smaller than that of a warning tone generated in the first warning processing, and processing for notifying the user that the front door 22 is locked and displaying a warning screen for prompting the user to stop the forced opening operation on the operation panel 104. In the second warning processing, for example, either one of the processing for generating a warning tone and the processing for displaying a warning screen may not be performed.

In step S1009, the printing apparatus 1 waits for a predetermined time period (one second) and then performs the processing in step S1001 again.

The processing of the flowchart ends when the front door 22 is unlocked through the unlock operation.

When the forced opening operation is detected in this way, warning the user of the forced opening operation enables preventing the printing apparatus 1 from being damaged by the forced opening operation.

Figure 13:
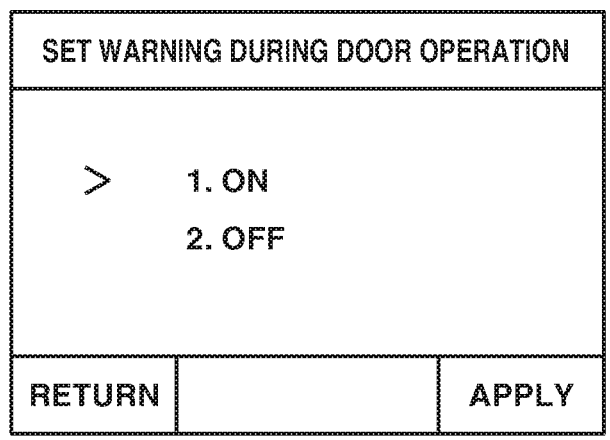
FIG. 13 illustrates an example warning setting screen.

For example, the printing apparatus 1 may be configured to be able to set whether to perform warning processing. For example, upon reception of an operation to a setting screen from the user, the printing apparatus 1 displays a warning setting screen as illustrated in FIG. 13. In the warning setting screen, the user can set whether to perform warning processing. When the user sets to perform warning processing, the warning processing illustrated in FIG. 10 is performed after the front door 22 is closed. On the other hand, when the user sets not to perform warning processing, the warning processing illustrated in FIG. 10 is not performed after the front door 22 is closed. More specifically, even if the open operation is performed on the front door 22 while the front door 22 is locked, the printing apparatus 1 does not display a warning screen or generate a warning tone.

Figure 14:
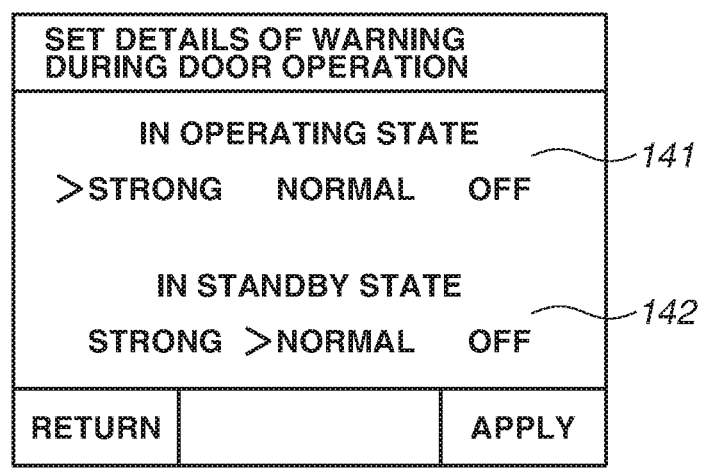
FIG. 14 illustrates an example selection screen.

For example, the printing apparatus 1 may be configured to be able to set either the first or the second warning processing to be performed when the printing apparatus 1 determines that the printing apparatus 1 is currently performing a function (YES in step S1003) or that the printing apparatus 1 is in the power saving mode (YES in step S1005). For example, upon reception of an operation on a setting screen from the user, the printing apparatus 1 displays a selection screen as illustrated in FIG. 14. An area 141 at the upper portion of the screen is used to set which warning processing to be preformed when the printing apparatus 1 determines that the printing apparatus 1 is currently performing a function (YES in step S1003). An area 142 at the upper portion of the screen is used to set which warning processing to be performed when the printing apparatus 1 determines that the printing apparatus 1 is in the power saving mode (YES in step S1005). When "STRONG" is selected, the first warning processing is set to be performed. When "NORMAL" is selected, the second warning processing is set to be performed. When "OFF" is selected, neither warning processing is set to be performed. More specifically, in the processing illustrated in FIG. 10, the first warning processing is set to be performed when the printing apparatus 1 determines that the printing apparatus 1 is currently performing a function (YES in step S1003), and the second warning processing is set to be performed when the printing apparatus 1 determines that the printing apparatus 1 is in the power saving mode (YES in step S1005).

For example, when the forced opening operation is detected while the warning screen is displayed or the warning tone is generated, the display time duration of the warning screen that is being displayed or the generation time duration of the warning tone that is being generated may be prolonged. For example, when the forced opening operation is detected while the second warning processing is performed, the first warning processing may be performed again to raise the warning level.

For example, the second warning processing may be performed in a state where the forced opening operation is continuously performed for less than a predetermined time, and the first warning processing may be performed in a state where the forced opening operation is continuously performed for the predetermined time period or longer.

Although, in the above-described form, the warning method is changed based on the state of the printing apparatus 1 when the forced opening operation is performed, the form is not limited thereto. For example, only the second warning processing may be performed. For example, the determination processing in steps S1003 and S1007 may be omitted.

Although, in the above-described form, the front door 22 is unlocked when a user operation is performed on the unlock screen, the form is not limited thereto. For example, the front door 22 may be locked during execution of printing by the printing apparatus 1 and unlocked upon completion of printing by the printing apparatus 1.

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to example embodiments, it is to be understood that the invention is not limited to the disclosed example embodiments. The scope of the following claims is to be accorded the broadest interpretation so as to encompass all such modifications and equivalent structures and functions.

This application claims the benefit of Japanese Patent Application No. 2018-046012, filed Mar. 13, 2018, which is hereby incorporated by reference herein in its entirety.

What is claimed is:

1. A printing apparatus comprising:
at least one processor, wherein the at least one processor is configured to function as:
a printing unit configured to perform printing via a printing unit;
a locking unit configured to lock an openable opening and closing unit as a part of a housing for covering the printing unit; and
a notification unit configured to perform, in a case that a user operation for opening the opening and closing unit is performed on the opening and closing unit in a state where the opening and closing unit is locked, predetermined notification processing according to a state of the printing apparatus at the time that the user operation is performed,
wherein, in a state where the opening and closing unit is locked, the opening and closing unit is not opened even when the user operation for opening the opening and closing unit is performed on the opening and closing unit,
wherein the predetermined notification processing includes at least one processing of processing for generating a predetermined notification tone from a speaker and processing for displaying at a display unit a screen for prompting a user not to perform on the opening and closing unit the user operation for opening the opening and closing unit.

2. The printing apparatus according to claim 1, wherein the at least one processor is configured to further function as:
a first setting unit configured to set, in a case that the user operation for opening the opening and closing unit is performed on the opening and closing unit, whether to perform the predetermined notification processing.

3. The printing apparatus according to claim 1, wherein the at least one processor is configured to further function as:
a transition unit configured to, in a case that the user operation for opening the opening and closing unit is performed on the opening and closing unit in a state where the opening and closing unit is locked and the printing apparatus is in a second state which provides lower power consumption than a first state, make a transition of the printing apparatus from the second state to the first state, wherein, when the user operation for opening the opening and closing unit is performed on the opening and closing unit in a state where the opening and closing unit is locked and the printing apparatus is in the second state, the printing apparatus makes a transition from the second state to the first state and then the notification processing is performed.

4. The printing apparatus according to claim 1,
wherein, in a case that the user operation for opening the opening and closing unit is performed on the opening and closing unit in a state where the opening and closing unit is locked and the printing apparatus is in a second state which provides lower power consumption than a first state, first notification processing is performed as the predetermined notification processing, and
wherein, in a case that the user operation for opening the opening and closing unit is performed on the opening and closing unit in a state where the opening and closing unit is locked and the printing apparatus is in the first state, second notification processing different from the first notification processing is performed as the predetermined notification processing.

5. The printing apparatus according to claim 4, wherein the at least one processor is configured to further function as:
a second setting unit configured to, in a case that the user operation for opening the opening and closing unit is performed on the opening and closing unit in a state where the opening and closing unit is locked and the printing apparatus is in the second state, set the first or the second notification processing to be performed as the predetermined notification processing.

6. The printing apparatus according to claim 4, wherein the first notification processing includes processing for generating a predetermined notification tone from a speaker for a first time period, and the second notification processing includes processing for generating the predetermined notification tone from the speaker for a second time period shorter than the first time period.

7. The printing apparatus according to claim 4, wherein the first notification processing includes processing for generating a predetermined notification tone with a first sound volume from a speaker, and the second notification processing includes processing for generating the predetermined notification tone from the speaker with a second sound volume smaller than the first sound volume.

8. The printing apparatus according to claim 4,
wherein the first notification processing includes processing for displaying at a display unit a first screen for prompting a user not to perform on the opening and closing unit the user operation for opening the opening and closing unit, and
wherein the second notification processing includes processing for displaying at the display unit a second screen, different from the first screen, for prompting the user not to perform on the opening and closing unit the user operation for opening the opening and closing unit.

9. The printing apparatus according to claim 1,
wherein, in a case that the user operation for opening the opening and closing unit is performed on the opening and closing unit in a state where the opening and closing unit is locked and the printing apparatus is performing printing, first notification processing is performed as the predetermined notification processing, and
wherein, in a case that the user operation for opening the opening and closing unit is performed on the opening and closing unit in a state where the opening and closing unit is locked and the printing apparatus is not performing printing, second notification processing different from the first notification processing is performed as the predetermined notification processing.

10. The printing apparatus according to claim 9, wherein the at least one processor is configured to further function as:
a third setting unit configured to, in a case that the user operation for opening the opening and closing unit is performed on the opening and closing unit in a state where the opening and closing unit is locked and the printing apparatus is performing printing, set the first or the second notification processing to be performed as the predetermined notification processing.

11. The printing apparatus according to claim 1,
wherein, in a case that the user operation for opening the opening and closing unit is continuously performed on the opening and closing unit for a predetermined time period or more in a state where the opening and closing unit is locked, first notification processing is performed, and
wherein, in a case that the user operation for opening the opening and closing unit is continuously performed on the opening and closing unit for less than the predetermined time period in a state where the opening and closing unit is locked, second notification processing different from the first notification processing is performed.

12. The printing apparatus according to claim 1, wherein the at least one processor is configured to further function as:
a detection unit configured to, in a state where the opening and closing unit is locked, detect that a predetermined user operation for unlocking the opening and closing unit on a predetermined configuration other than the opening and closing unit included in the printing apparatus is performed; and
an unlocking unit configured to, in a case that a performance of the predetermined user operation is detected, unlock the opening and closing unit.

13. The printing apparatus according to claim 12, wherein the at least one processor is configured to further function as:
a performance unit configured to, in a case that a performance of the predetermined user operation is detected, perform predetermined preparation processing on the printing unit.

14. The printing apparatus according to claim 12, wherein the predetermined configuration is a display unit for displaying a screen.

15. The printing apparatus according to claim 14, wherein the predetermined user operation is a user operation on a predetermined screen displayed by the display unit.

16. The printing apparatus according to claim 13, wherein, in a case that a performance of the predetermined user operation is detected, the opening and closing unit is unlocked after completion of the predetermined preparation processing.

17. The printing apparatus according to claim 15, wherein the predetermined screen is displayed in a case that an error occurs in at least a part of the printing unit.

18. The printing apparatus according to claim 15, wherein the predetermined screen is displayed in a case that an operation for replacing at least a part of the printing unit is performed.

19. The printing apparatus according to claim 1, wherein the printing unit ejects ink onto a recording medium to perform printing.

* * * * *